(12) United States Patent
Knott et al.

(10) Patent No.: US 6,721,649 B2
(45) Date of Patent: Apr. 13, 2004

(54) ENGINE EMISSION ANALYZER

(75) Inventors: Christopher Norman Knott, Rock Springs, WY (US); Norman Sydney Knott, Creston (CA)

(73) Assignee: Oasis Emission Consultants Inc., Calgary (CA)

( * ) Notice: Subject to any disclaimer, the term of this patent is extended or adjusted under 35 U.S.C. 154(b) by 252 days.

(21) Appl. No.: 10/057,379

(22) Filed: Nov. 20, 2001

(65) Prior Publication Data

US 2002/0156568 A1 Oct. 24, 2002

Related U.S. Application Data

(60) Provisional application No. 60/249,436, filed on Nov. 20, 2000.

(51) Int. Cl.[7] ............................................... F01N 11/00
(52) U.S. Cl. .................... 701/114; 73/23.31; 340/632; 60/276
(58) Field of Search ................. 701/114, 33; 73/23.31, 73/23.32, 23.33; 340/632–634; 60/276

(56) References Cited

U.S. PATENT DOCUMENTS

| | | | |
|---|---|---|---|
| 3,696,247 A | 10/1972 | McIntosh et al. | |
| 4,302,814 A | 11/1981 | Full et al. | |
| 4,418,566 A | 12/1983 | Beck et al. | |
| 5,105,651 A | 4/1992 | Gutmann | |
| 5,129,257 A | 7/1992 | Carduner et al. | |
| 5,225,996 A * | 7/1993 | Weber | 702/187 |
| 5,431,042 A | 7/1995 | Lambert et al. | |
| 5,585,552 A | 12/1996 | Heuston et al. | |
| 5,705,742 A | 1/1998 | Fox et al. | |
| 5,750,886 A | 5/1998 | Lambert et al. | |
| 5,753,185 A | 5/1998 | Mathews et al. | |
| 5,916,294 A | 6/1999 | Naber et al. | |
| 6,308,130 B1 * | 10/2001 | Vojtisek-Lom | 701/114 |
| 6,470,732 B1 * | 10/2002 | Breton | 73/23.31 |

* cited by examiner

*Primary Examiner*—Andrew M. Dolinar
(74) *Attorney, Agent, or Firm*—Robert H. Barrigar

(57) ABSTRACT

A method for analyzing the exhaust emissions of large industrial engines that: produces emission information in real time and permits the generation of test results immediately after an emission test is conducted, is disclosed. The method includes the real time calculation of exhaust volumetric flow rate from fuel gas flowrate and the use of real time intake manifold conditions to determine engine load from an engine load curve. A portable apparatus for performing the method, comprising a programmed computer, data collection buffer, computer readable database and display device is also disclosed.

30 Claims, 14 Drawing Sheets

ENGINE EMISSION ANALYZER

RELATED APPLICATION

This application claims the benefit of U.S. Provisional Patent Application No. 60/249,436, filed Nov. 20, 2000.

FIELD OF THE INVENTION

This invention relates to methods and portable apparatus for testing engine exhaust, particularly the exhaust from large industrial engines.

BACKGROUND OF THE INVENTION

Large, industrial engines are used for a variety of purposes, including: to generate electrical power; to drive pumps; and to drive compressors for the compression of natural gas in pipelines. In use, these engines emit a variety of gases, including carbon monoxide ("CO"), carbon dioxide ("$CO_2$") and nitrogen/oxygen compounds ("NO" and "$NO_2$") Concern about the environmental effect of the exhaust from these engines has resulted in widespread regulation of the operation of these engines, and particularly regulation of exhaust emissions. In many countries, these engines may not be operated without a permit granted by the relevant regulatory body.

Typically, such permits set out maximum emission limits for specified gases. The permit for a particular engine may merely set out a maximum emission rate for each specified gas or it may specify a maximum emission rate for each specified gas at a specified engine load. To ensure that the engine complies with the permitted emission rate, such permits also typically require that the engine emissions be monitored using a specified testing protocol. The permit may require that the emissions be monitored continuously, but more commonly, such permits require that the engine be tested periodically, such as every year.

The test protocols for periodic engine emission testing typically require that a series of tests of set duration be conducted. As well, the test protocols typically specify pre-test and post-test calibration procedures for the gas sensors used to measure the concentration of the test gases. Typically, when an industrial engine is tested for compliance with the permitted emission rate, neither the emission rates of the test gases nor the engine load can be easily measured directly. Rather, the test protocols provide for a variety of different measurements to be taken so as to enable the testers to estimate the emission rates of the test gases and the engine load.

It is difficult to measure the weight per unit time of a given regulated effluent gas (test gas) directly, so it is conventional to measure the concentration of the test gas in the exhaust and the volume of the exhaust gas and from those measurements compute the rate of emission of the test gas in pounds per hour (lbs/hr) or other designated units of measurement. In simple terms, the emission rate of a test gas is determined by: measuring the concentration of the test gas, typically in parts per million; determining or at least estimating the exhaust gas volumetric flow (that is, the rate of exhaust gas emission as indicated by a unit of volume over a unit of time); and using these two numbers to estimate the emission rate of the test gas.

It is, however, further difficult to accurately directly measure the volumetric flow of the hot, turbulent exhaust gas. Therefore, conventionally, the exhaust gas volumetric flow is also estimated. For an engine powered by natural gas, the exhaust gas volumetric flow can be estimated from: the volumetric flow of the fuel gas; a fuel factor constant; and the concentration of oxygen ($O_2$) in the exhaust gas. The volumetric flow of the fuel gas can be measured directly with a flowmeter, but it must be corrected for temperature and pressure to be of use in estimating the exhaust gas volumetric flow. The fuel factor constant is determined from the concentrations of the constituent compounds of the fuel gas. In simple terms, the exhaust gas volumetric flow is estimated by determining the corrected volume of fuel gas and calculating, on the basis of the fuel gas composition, what the volume will be after combustion, with a correction for the concentration of $O_2$ in the exhaust gas.

As well, using previously known procedures and conventional portable apparatus for engine emission testing, the engine load is usually estimated from the work done by whatever equipment the engine is driving. For example, if the engine is driving a compressor, the work done by the compressor may be determined by measuring the pressure and volumetric flow of gas upstream of the compressor, and the pressure of the gas downstream of the compressor. Such measurements can be used to determine the work done by the compressor, but, due to power losses in the compressor, and in the linkage between the engine and the compressor, they may not be an accurate indicator of the engine load. Depending on these power losses, the actual engine load may be up to 12% greater than the engine load estimated by this method, resulting in errors in the emission test results. While some tolerance for such errors can be taken into account when the regulatory authority sets emission standards, it would be preferable to obtain more accurate measurements of engine load.

The concentrations of the test gases can be measured directly with any of a variety of commercially available gas analyzers, including electrochemical, non-dispersive infrared and chemiluminescence gas analyzers. Typically, these gas analyzers contain sensors (also referred to in the trade as "cells") for measuring the concentration (in parts per million) of the gases specified in the engine permit (usually CO, $CO_2$, NO and $NO_2$) As well, the gas analyzers typically also measure the concentration of $O_2$. In the known procedures for analyzing engine emissions, the $O_2$ measurements are used as indicators of whether the engine is running in a rich or lean combustion state.

The sensors may be cross-sensitive in that their accuracy may be affected by the presence of non-target gases (referred to as "interfering gases"). Cross-sensitivity is also referred to as the interference response. A sensor's cross-sensitivity to a particular interference gas is tested by exposing the sensor and a sensor targeted to the interference gas, to a test gas containing the interference gas but not containing the target gas of the sensor being tested for cross-sensitivity. For example, a $NO_2$ sensor's cross-sensitivity to NO would be tested for by exposing the $NO_2$ sensor and a NO sensor to a test gas containing NO but not containing $NO_2$. Any response by the $NO_2$ sensor to the test gas would be due to cross-sensitivity. Cross-sensitivity may be quantified by comparing the interference response of the sensor being tested (the $NO_2$ sensor in the example) with the response of the interference-gas-targeted sensor (the NO sensor in the example).

The measurements from the gas sensors may not be stable, in that they may have a tendency to drift over time when the sensor is exposed to a gas with a constant concentration of the relevant test gas. This quality of the sensors is referred to as stability or sensor drift, the two terms implying opposite characteristics. Sensor drift may be evaluated by exposing the sensor to a calibration gas and noting how the sensor measurements vary over time. The extent of sensor drift is often stated as the maximum absolute percentage deviation from an average measurement recorded shortly after the measured response time of the sensor.

Further, the accuracy of the measurements from a sensor may not be consistent over a range of concentrations, particularly when the sensor is subject to rapidly changing concentrations of the test gas. This quality of a sensor is referred to as degree of linearity of the sensor, or simply "linearity". Linearity is tested by first exposing a sensor to at least two gases having different concentration of the test gas, one after the other, and observing the response of the sensor over time to the different concentrations of the test gas.

The test protocols typically require that the sensors be calibrated within a specified period before and after the relevant test. The test protocols typically require that the sensors be tested for calibration error and cross-sensitivity before and after each test run. The calibration error test results may be used to correct the sensor's measurements, or if they fall outside of the required parameters, they may be cause to reject the results from the test run as unreliable, and possibly to indicate the need to replace the sensor.

The testing procedure typically involves transporting a gas analyzer to the engine location; connecting it to the exhaust stream; running the required tests and recording the test data; disconnecting the gas analyzer; removing it from the test location; and processing the data to generate the test results at some later date.

The conventional delay in processing the test data means that it is not known whether the engine has met the required emission standards until the testing is complete and the data can be processed, which typically does not occur until after the testing equipment has been removed from the engine site. If it turns out from the later data processing that an engine has failed a test, it is typically necessary to re-transport the testing apparatus to the test site and reinstall the testing equipment in order to rerun the test. In some cases, tuning the engine might make the difference between meeting the permit requirements and failing the test. However, various previously known testing procedures do not provide feedback of data on the engine emissions in real time, and therefore offer no guidance with respect to tuning the engine.

For an engine powered by natural gas, the data required to determine the emission rates of the test gases at a certain engine load include: the concentration of the test gases in the engine exhaust; the concentration of $O_2$ in the exhaust; the fuel gas volumetric flow; the fuel gas temperature; the fuel gas pressure; and the engine load. The concentrations of the specified test gases are recorded electronically. However, with the known procedures for performing emission testing, the fuel gas volumetric flow, the fuel gas pressure; the fuel gas temperature, and the engine load are merely written down by the person conducting the test. Typically, this handwritten information is later manually entered into a computer database or spreadsheet for processing with other information recorded during the test. It is clear that errors can occur both at the initial note-taking and later when the information is subsequently entered into the computer.

What is needed is a portable engine emission analyzer that: produces engine emission information in real time; permits the generation of a test report immediately after an emission test is conducted; reduces the risk of operator error; and is used in combination with a more accurate source of engine load information.

BRIEF SUMMARY OF THE INVENTION

In ordinary engineering parlance, and in this specification, "in real time" means data and actions on data occur or are available in real time, or are so time-correlated to the sequence of physical events to which the data relate so as to provide the same benefit, for all practical purposes, as if they had occurred or were available simultaneously with the physical events to which they relate.

The method of emissions testing and determination of the present invention differs from most conventional prior methods in that it comprises a method of testing an engine and analyzing the exhaust emissions of the engine and making the necessary computations to determine the emission rate of a specified test gas or test gases in real time. Most conventional prior methods are incapable of providing real-time results but instead require a delay between the measurement stage of the method and at least part of the computation stage of the method.

The preferred method of analyzing the exhaust emissions of gas-fueled engines in real time according to the invention is capable of providing a relatively accurate determination of the emission rate for the test gas (to the extent that the sensors used are reliable and that the test equipment is accurately calibrated).

In one aspect of the invention, suitable for use for determining the amount of a specified test gas in the exhaust of an engine powered by natural gas fuel or other gaseous fuel, the method includes the steps of:

(a) measuring the flowrate, temperature and pressure of the fuel gas;
(b) measuring the relative concentration of the test gas in the engine exhaust;
(c) computing a volumetric flowrate of the exhaust gas from the measurement data representing the flowrate, temperature and pressure of the fuel gas;
(d) computing an emission rate (conventionally expressed in the units lbs/hr) of the test gas from the exhaust gas volumetric flowrate data and the data representing the relative concentration of the test gas;
(e) determining or measuring the engine load at which steps (a) and (b) occur, and computing an emission rate per engine load (conventionally expressed in the units lbs/BHP-hr) from the computed emission rate and engine load;
(f) optionally, recording or displaying the calculated test gas emission rate; and
(g) optionally performing further calculations and tabulations of the gas emission rate data, e.g. comparing the calculated test gas emission rate to the maximum permitted emission rate and, if the calculated emission rate is greater than the permitted emission rate, displaying a warning or alarm or record or display of this result.

In the foregoing summary, and in this specification generally, the step of "measuring" may be a composite step involving measurement of one or more given parameters and then performing a calculation on it to derive an estimated value for the parameter whose value is sought. In other words, measured values include estimated values where direct measurement of a parameter is difficult. Further, in the above summary, and in this specification generally, the step of "computing" or "calculating" includes providing as an interim or final output the results of the computation in digital data format. Further, the step of "measuring" is to be taken as including, as necessary, the conversion of any analog measurement data to digital format. All of the foregoing computation steps may be performed in real time by a programmed computer and may be repeated a preselected number of times at preselected time intervals.

As discussed above, the method normally includes the step of determining the engine load (typically expressed in BHP) so that an emission rate per engine load (typically lbs/BHP-hr) may be calculated and recorded or displayed as required. However, in some cases this step may not be necessary. For example, if the maximum emission levels in a permit are not in terms of emission rate per engine load, there may be no need to determine the engine load or compute the emission rate per engine load.

Preferably, the step of determining the engine load comprises correlating in real time engine data, including intake manifold temperature and pressure, and the engine RPM (usually manually entered as an input into the programmed computer) with a load curve for the engine. A load curve appropriate to a particular engine is typically prepared by, and obtained from, the manufacturer of the engine. A load curve is typically specific to a particular model, but a load curve may instead be specific to a particular conformation (e.g. turbo-charged or naturally aspirated) of a particular model, or to a particular conformation of a particular model under particular operating conditions (e.g. intercooler water temperature or manifold temperature). Correlating the engine data to the load curve involves: selecting the appropriate load curve, which entails comparing some of the known engine data with the load curve selection criteria; and then using the load curve data and additional engine data to calculate the engine load. Preferably, discrete values not found on the engine manufacturers load curve are calculated using Newton's Method of Interpolation. Preferably the data from each load curve is incorporated into a computer routine (sometimes referred to in the trade as a "function") along with Newton's Method of Interpolation, such that the programmed computer may "call the function", that is, provide a particular routine with values for the required variables and instruct the routine to calculate the engine load.

Alternatively, the engine load may be approximated by correlating the engine RPM with the engine manufacturer's RPM-engine load specifications(preferably stored in the computer-readable database).

In another aspect of the invention, an engine emission analyzer comprises a programmed computer connected to: a data collection buffer, a computer-readable database and a display device. The data collection buffer is configured to connect to, and receive data from: a gas analyzer for sensing the relative concentration of the specified test gas or gases and $O_2$; an intake manifold temperature sensor; an intake manifold pressure sensor; a fuel gas flowmeter; a fuel gas pressure sensor; and a fuel gas temperature sensor. The data buffer is configured to: accept the sensed data (some in analog and some in digital form), digitize the analog data, organize the data into batches that can be recognized by the programmed computer, and send the batches to the programmed computer. The computer-readable database is for storing data used in performing the engine emission analysis, including: the specifications of the engine being tested; the maximum emission limits for each of the test gases (pollutants) specified in the relevant permit; the testing parameters; and various calculation factors. The display device is preferably a display screen, but may be a printer or any other suitable means for indicating, recording or storing test results for the benefit of the user. The programmed computer is programmed to receive batches of data from the data buffer; to call up and receive data from the database as required; to perform the engine emission analysis calculations; and to send data representing computed emission rates and other relevant data to the display device.

Preferably, the data collection buffer is configured to connect to, and receive data from, a second gas analyzer and two exhaust temperature sensors, so that the apparatus may also be used to test the effectiveness of in-line catalyst elements (catalytic converter) for treating exhaust. In such use, the data collection buffer is connected to an upstream gas analyzer that draws exhaust gas from upstream of the catalytic converter, an upstream temperature sensor that senses the exhaust temperature upstream of the catalytic converter; a downstream gas analyzer that draws in exhaust gas from downstream of the catalytic converter; and a downstream temperature sensor that senses the exhaust temperature downstream of the catalytic converter. The data collection buffer digitizes this data, organizes it into batches that can be recognized by the programmed computer, and sends the batches to the programmed computer. The programmed computer calculates the differences between the upstream and downstream levels of the relevant test gas or gases; calculates the difference between the upstream temperature and the temperature necessary to stimulate the desired chemical reaction between the catalyst and the exhaust gas; calculates the difference between the upstream and downstream temperature of the exhaust gas (an indicator of the extent to which the desired catalyzed reaction, which is exothermic, is occurring); and sends the calculated results to the display device in real time.

Preferably, the programmed computer is programmed to calculate, in real time, and send to the display device, brake-specific fuel consumption (BSFC) for use as a guide to engine tuning. The BSFC, typically expressed as rate of fuel consumption per engine load, is an indication of engine efficiency, with a lower BSFC indicating greater efficiency than a higher BSFC. In use for tuning an engine, the programmed computer calculates BSFC from the measurements of intake manifold pressure and temperature, and fuel-gas flow, pressure and temperature, and sends the digitized result to the display device or other suitable recording device.

The various features of novelty that characterize the invention are pointed out with more particularity in the appended claims. For a better understanding of the invention, its operating advantages and specific objects attained by its use, reference should be made to the accompanying drawings and descriptive matter in which there are illustrated and described preferred embodiments of the invention.

DESCRIPTION OF A SPECIFIC EMBODIMENT

Figure 1:
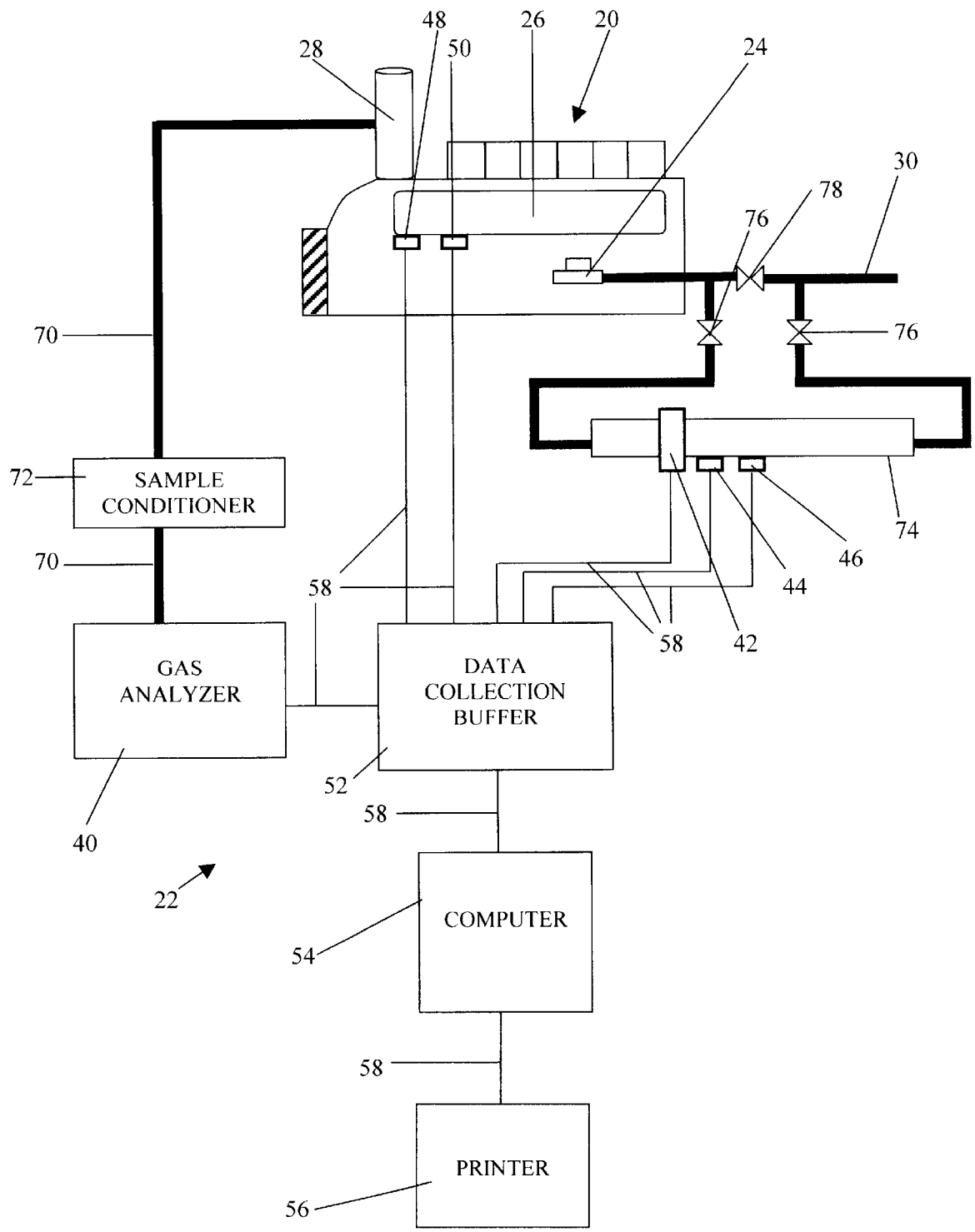
FIG. 1 is a schematic block diagram of the engine emission analyzer connected to an engine, in accordance with the principles of the present invention.

FIG. 1 shows a conventional industrial, gas-fuelled engine (20) and a preferred embodiment of the engine emission analyzer (22) according to the invention. The engine includes: a fuel gas inlet (24) for coupling to a fuel gas line (30); intake manifold (26); and exhaust stack (28). The fuel gas line (30) provides fuel gas to the engine (20). The working parts of the engine (20) are of no interest for the purposes of the description of the invention and are omitted from the drawing in the interest of simplicity.

The engine emission analyzer (22), includes a data collection buffer (52); a programmed computer (54) incorporating a display device (typically a video monitor) (not shown) and a computer readable database (not shown) The engine emission analyzer (22) is connected to a printer (56); a gas analyzer (40), a fuel gas flowmeter (42); a fuel gas pressure sensor (44); a fuel gas temperature sensor (46); an intake manifold pressure sensor (48); and an intake manifold temperature sensor (50). The meter and sensors are selected for suitability in measuring selected parameters associated with an industrial gas-fuelled engine. The data collection buffer (52) is connected by suitable communication links (58) to the gas analyzer (40); the fuel gas flowmeter (42); the fuel gas pressure sensor (44); the fuel gas pressure sensor (44); the intake manifold pressure sensor (48); the intake manifold temperature sensor (50); and the programmed computer (54). The programmed computer (54) is connected by suitable communication link (58) to the printer (56).

In a preferred embodiment, the gas analyzer (40) is an electrochemical five-gas analyzer, such as the ECOM SG PLUS™, manufactured by ECOM America. It will be clear to those skilled in the art of exhaust gas analysis that alternative gas analyzers, such as non-dispersive infrared gas analyzers and chemiluminescence gas analyzers, may also or instead be used, The gas analyzer (40) contains sensors (not shown), also referred to as cells, for measuring the concentrations of CO, NO, $NO_2$ and $O_2$. These sensors are typically capable of measuring concentrations of the relevant test gases as small as a few parts per million. The measurements from NO cells are affected by changes in temperature, so the gas analyzer (40) also includes a NO cell temperature sensor (e.g., a thermocouple) (not shown).

In the embodiment shown in FIG. 1, the gas analyzer (40) is a typical extractive type, in that it draws gas from the exhaust stack (28) via an internal vacuum pump (not shown). Also typically, the exhaust gas flows from the exhaust stack (28) through a heated sample line (70) (to prevent condensation) to a sample conditioner (72). The sample conditioner (72) dries the exhaust gas with a desiccant and then heats it to avoid condensation. The heated exhaust gas then enters the gas analyzer (40) where it is immediately cooled below the dew point by an internal cooler (not shown). This process is the usual method of extracting exhaust gas when using an extractive-type gas analyzer and is intended to ensure that the exhaust gas analyzed by the gas analyzer (40) is dry.

The fuel gas flowmeter (42) is any suitable selected commercially available turbine-type meter, such as the 7400 Series (TM) turbine meter manufactured by Barton Instruments Systems Ltd. The fuel gas flowmeter (42) is positioned within a rigid pipe, referred to as a meter run (74). Typically, the manufacturer's specifications require that the turbine meter be installed at least 10 pipe diameters downstream and 5 pipe diameters upstream of any flow disturbances such as elbows or sudden expansions. In use, a turbine-type flowmeter emits a voltage-pulse output, with the pulse rate proportional to the velocity of the fuel flow. A numeric value provided by the flowmeter manufacturer, referred to as the "K-factor", is used as a conversion factor to convert the frequency of the pulsed output to a volumetric flow rate.

The fuel gas pressure sensor (44) is any suitable selected commercially available pressure transducer, such as the PT-400 model (TM), manufactured by SRP Controls. The fuel gas pressure sensor (44) is usually positioned in the meter run (74) proximate to the fuel gas flowmeter (42). Typically, the fuel gas pressure sensor (44) emits a fluctuating current output (typically in the range 4–20 mA) with the current being proportional to the fuel gas pressure.

The fuel gas temperature sensor (46) is any suitable selected commercially available thermocouple, such as the type "J"™ thermocouple manufactured by Alltemp Sensors. The fuel gas temperature sensor (46) is usually positioned in the meter run (74) proximate to the fuel flowmeter (42). Typically, the fuel gas temperature sensor (46) emits a fluctuating voltage output with the voltage being proportional to the fuel gas temperature.

As shown in FIG. 1, the meter run (74) is connected to the fuel gas line (30) so that the fuel gas can be diverted to pass through the meter run (74). The meter run (74) is typically connected to the fuel gas line with flexible high-pressure, Teflon™-lined hose. When the fuel gas bypass valves (76) are open and the fuel gas block valve (78) is closed, the fuel gas flows through the meter run (74) en route to the fuel gas inlet (24) Once the fuel gas bypass valves (76), fuel gas block valve (78) and associated T-junctions (tees) are installed in the fuel gas line (30), the meter run (74) may be installed and removed without stopping the engine (20). The meter run(74) is generally installed downstream of conventional fuel gas scrubbers (not shown) so that the fuel gas is dry when the temperature, pressure and flow measurements are made.

The intake manifold pressure sensor (48) is any suitable selected commercially available pressure transducer, such as the PT-400 model™, manufactured by SRP Controls. The intake manifold pressure sensor (48) is installed where it can sense the pressure within the intake manifold (26). Typically, the intake manifold pressure sensor (48) emits a fluctuating current output (4–20 mA) with the current being proportional to the intake manifold pressure.

Figure 2:
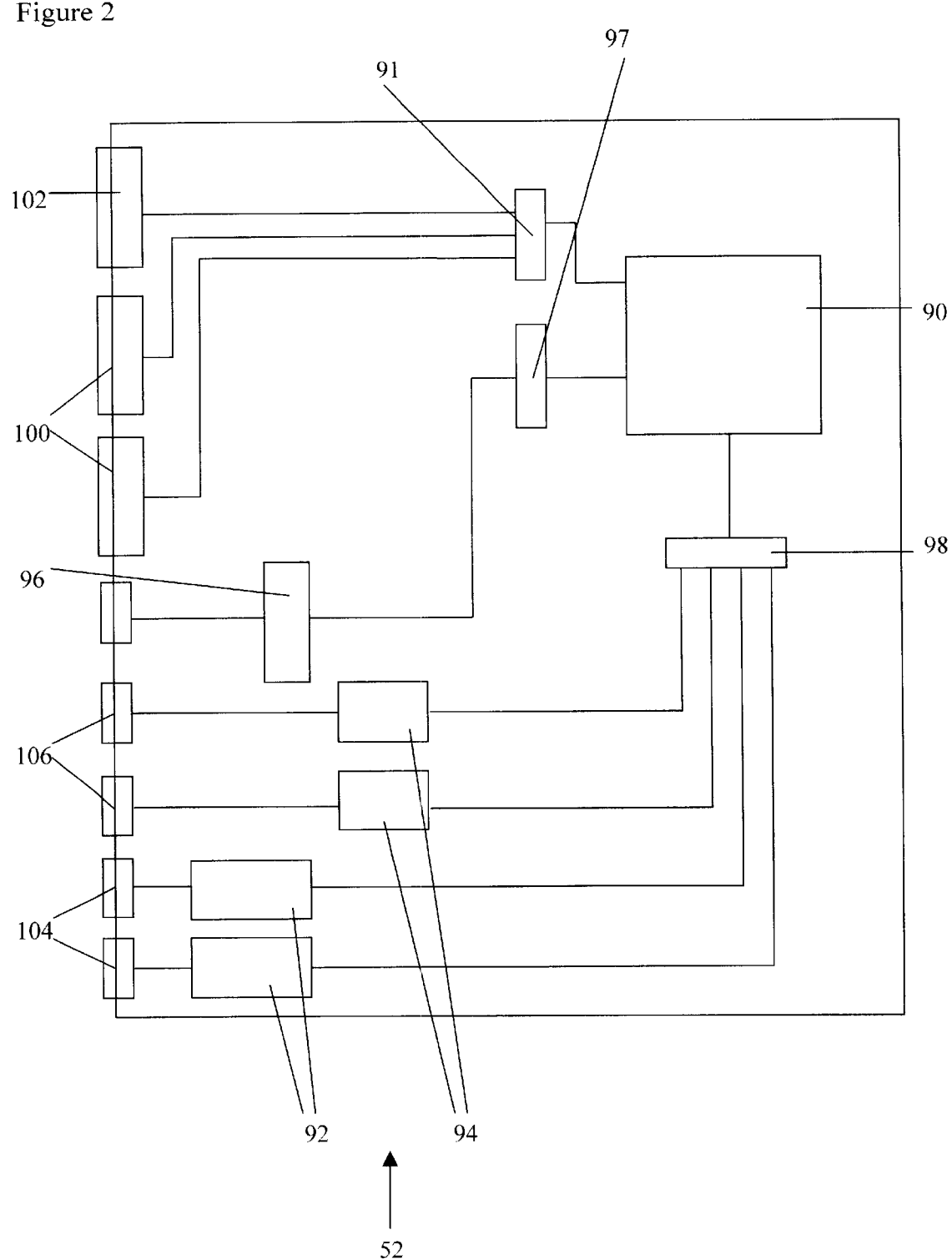
FIG. 2 is a schematic block diagram of the data collection buffer of FIG. 1.

The intake manifold temperature sensor (50) is preferably any suitable selected commercially available thermocouple, such as the type "J"™ thermocouple manufactured by Alltemp Sensors. The intake manifold temperature sensor (50) is installed where it can sense the temperature of the gases within the intake manifold (26). Typically, the intake manifold temperature sensor (50) emits a fluctuating voltage output with the voltage being proportional to the intake manifold temperature, As shown in FIG. 2, the data collection buffer (52) includes: a microprocessor (90) with internal Flash EPROM (not shown) and Static RAM (not shown); a UART (91); two thermocouple amplifiers (92); two current-to-voltage precision resistor circuits (94); a pulse signal amplifier (96); a pulse counter (97); an analog to digital converter (98); a gas analyzer serial port (100); a programmed computer serial port (102); two temperature sensor communication ports (104); and two pressure sensor communication ports (106).

An example of a suitable microprocessor is model number MC68HC16Z1 manufactured by Motorola. For ease of understanding, the pulse counter (97) and analog to digital converter (98) are shown as components separate from the microprocessor in FIG. 2. However, one pulse counter input and eight analog-to-digital converter inputs are integral parts of the Motorola MC68HC16Z1 microprocessor.

The Flash EPROM is an electrically programmable read-only memory device wherein a program can be read into the memory and then made permanent by sending a higher than normal voltage (the "flash" voltage) to the device Such Flash EPROMs are well known in the art and are readily commercially available. An example of a suitable Flash EPROM is model number AT49F001 manufactured by Atnel. It will be clear to those skilled in the computer art that other memory storage devices could be used.

The Static RAM is a form of random access memory device. Such Static RAMs are well known in the art and are commercially available. An example of a suitable static Ram is model number AS7C1026 manufactured by Alliance Semiconductors. It will be clear to those skilled in the art that other random access memory devices could be used instead.

The UART (91) is a universal, asynchronous receiver/transmitter which controls communication between the microprocessor (90) and the serial ports (100)(102). Such devices are well known in the art and are commercially available. An example of a suitable UART is model number TL16C5541FN manufactured by Texas Instruments.

The thermocouple amplifiers (92) amplify the signals from the intake manifold temperature sensor (50) and the fuel gas temperature sensor (46). In a preferred embodiment, the thermocouple amplifiers (92) amplify the signal from the temperature sensors so that each 10 mV of the amplified signal corresponds to 1 degree Celsius. Such thermocouple amplifiers (92) are well known in the art and are commercially available. An example of a suitable thermocouple amplifier is the "Monolithic Thermocouple Amplifier with Cold Junction Compensation", model number AD594 version 'C', manufactured by Analog Devices Inc.

The current-to-voltage precision resistor circuits (94) convert the electric current fluctuations in the signals received from the intake manifold pressure sensor (48), and the fuel gas pressure sensor (44), into voltage fluctuations. In a preferred embodiment, the voltage precision resistor circuits (94) convert a 4 to 20 mA amperage fluctuation into a 0.4 to 2 V voltage fluctuation. Such current-to-voltage precision resistor circuits (94) are well known in the electrical art and are readily commercially available.

The pulse signal amplifier (96) conditions the voltage pulse signals from the fuel gas flowmeter (42). Typically each voltage pulse generated by a turbine-type flowmeter is a sine wave. The pulse signal amplifier (96) converts the sine waves of the voltage pulses into square waves, which conversion facilitates counting the pulses. The pulse signal amplifier (96) conditions the voltage pulse signals by over amplifying the sine waves and squaring off the resulting peaks and valleys. Such pulse signal amplifiers (96) are well known in the art and are readily commercially available. The signal from some flow meters is preamplified by the flowmeter device, in which case the pulse signal amplifier (96) may not be necessary.

The pulse counter (97) counts the voltage pulses it receives and produces digital data representing the pulse count. The pulse count data is sent to the microprocessor (90). Such pulse counters (97) are well known in the art and are readily commercially available.

The analog-to-digital converter (98) receives: the amplified signals from the intake manifold temperature sensor (50) and the fuel gas temperature sensor (46); the converted signals from the intake manifold pressure sensor (48) and the fuel gas pressure sensor (44); and the conditioned signal from the fuel gas flowmeter (42), all of which code data by way of absolute voltage or voltage differentials. The analog-to-digital converter (98) converts these analog voltages into digital data interpretable by the microprocessor (90) and the programmed computer (54).

In a preferred embodiment, the gas analyzer (40) produces digital signals interpretable by the microprocessor (90) and the programmed computer (54). The gas analyzer (40) sends the data collection buffer (52) data strings, containing data from the sensors, one after another. Each data string has an identifier which indicates the beginning of the data string or the end of the data string. For example, the Ecom SG PLUS™ gas analyzer uses two characters comprised of bit sequences, hexadecimal '00' and hexadecimal 'F0', to identify the beginning of the data strings which it produces. Each data string is of a set length. The data strings are comprised of several fields, each of set size and set order within the data string. Each field has an identifier which distinguishes it from the other fields in a particular data string, but which is the same for that particular field in the other data strings. The data from each particular sensor in the gas analyzer are contained in the same particular field in every data string. For example the data from the NO sensor might be contained in the fourth field in the data strings. The fourth field could be identified by counting bits from the identifier which indicates the beginning of the data string and by recognizing the fourth fields distinguishing identifier. This identification could be confirmed by counting the bits or characters comprising the data identified as the fourth field.

Figure 3:
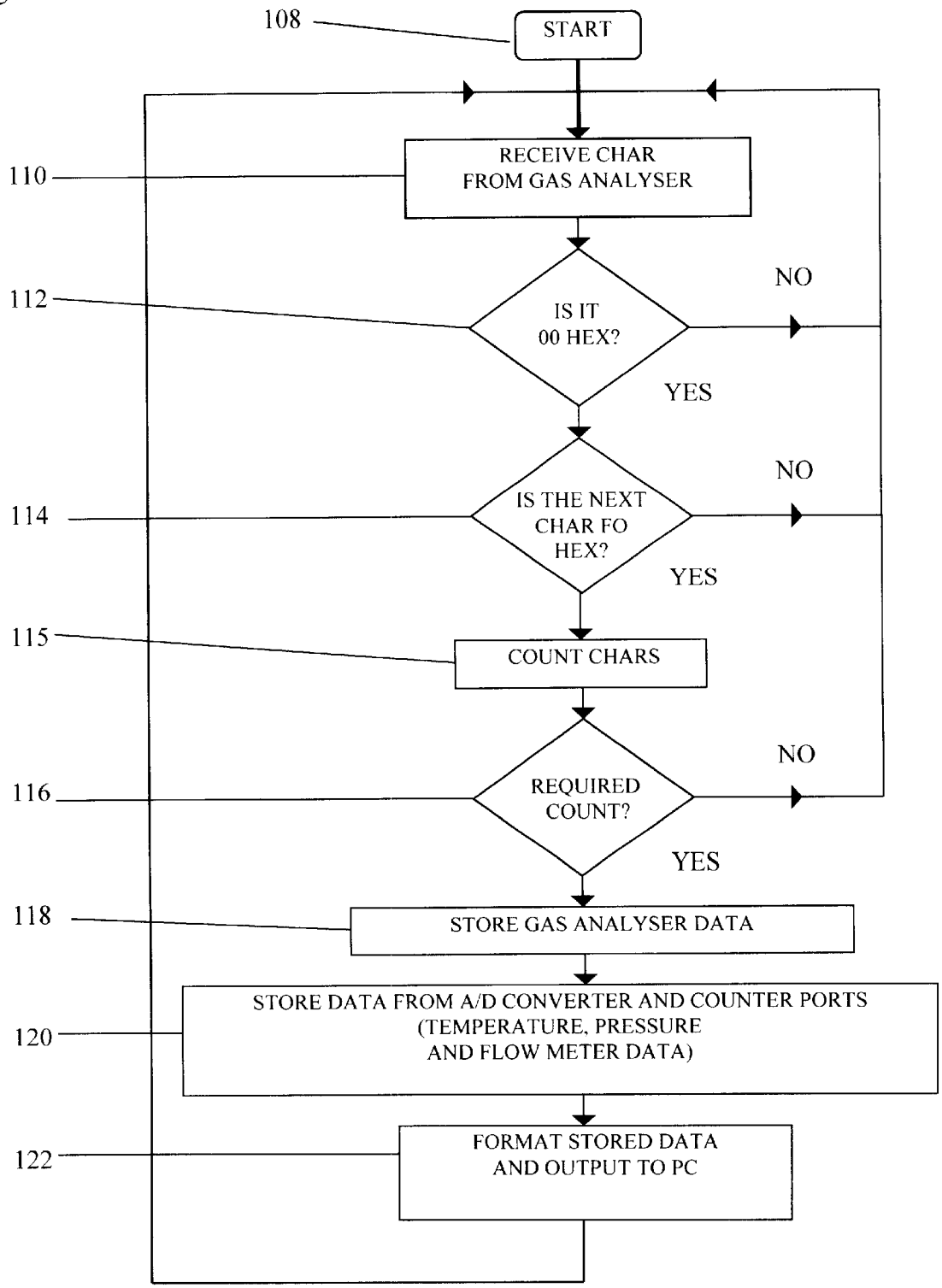
FIG. 3 is a flow chart of steps performed by the data collection buffer of FIG. 2 in receiving, organizing and sending data.

When power is applied to the data collection buffer (52), the microprocessor (90) starts and runs a program stored in the Flash EPROM (108). As shown in FIG. 3, the program instructs the microprocessor (90) to receive data from the gas analyzer serial port (110). Each bit sequence received is compared with the bit sequence known to indicate the beginning or end of a data string. This process continues until two sequential input bit sequences match the special bit sequences which signify the start or end of a data string. This sequence of bit sequences, confirmed by counting the bits in the assumed data string, and checking the field identifiers in the data, are used by the microprocessor (90) to verify that a valid data string has been received. The bit sequences identifying the beginning or end of the data string are used as a reference point, and the required data are extracted from the data string using the known field length and order, In a preferred embodiment using the Ecom SG PLUS™ gas analyzer, the microprocessor (90) compares a received character to "00" hexadecimal (112). If the received character is "00" hexadecimal, the microprocessor (90) compares the next character to "F0" hexadecimal (114). If the next character is "F0" hexadecimal then the microprocessor (90) counts the characters (115) in the data string and reviews the string for the proper field identifiers (116).

Once the relevant gas analyzer data have been extracted from the data string, the data are stored in the SRAM (118) and the microprocessor (90) stops receiving data from the gas analyzer serial port (100). The microprocessor (90) then retrieves data representing the measurements from the fuel gas flowmeter (42); fuel gas pressure sensor (44); fuel gas temperature sensor (46); intake manifold pressure sensor (48); and the intake manifold temperature sensor (50). The microprocessor (90) then stores these data in SRAM. The microprocessor (90) then formats the gas analyzer and other sensor data and sends the data to the programmed computer (122). The microprocessor (90) then resumes receiving data from the gas analyzer serial port (110) and the cycle is repeated continually.

In use, the programmed computer (54) receives digitized data from the data collection buffer (52), including data representing the following: measurements of the concentrations of NO, $NO_2$ CO, $CO_2$ and $O_2$; measurements of the NO cell temperature; measurements of the intake manifold pressure; measurements of the intake manifold temperature; measurements of the fuel gas volumetric flow rate; measurements of the fuel gas temperature; and measurements of the fuel gas pressure.

In one embodiment of the invention, the person conducting the test measures the ambient air pressure and the ambient temperature and enters these measurements into the programmed computer (54). It will be clear to those skilled in the art that suitable thermometers and barometers (not shown) can be connected to the programmed computer (54) by suitable communication link so as to transmit the ambient temperature and pressure data continuously to the programmed computer (54).

The programmed computer (54) has associated with it a computer-readable database (not shown). Typically, the database is a component of the computing device incorporating the programmed computer, but the database may also be a peripheral device connected to the programmed computer; a remote database accessed via a long-distance communication means such as the Internet; or a combination of these, in that different parts of the data used by the programmed computer in determining emission rates may be in different databases. For simplicity, this description refers to one database though it is understood that more than one database may be used.

The following data are stored in the database so as to be accessible to the programmed computer (54) during a test:

a) the specifications of the engine to be tested, including typically: the model number, compression ratio, timing, carburetor setting (e.g. lean), engine displacement, intercooler water temperature (if appropriate), rated BHP, and rated BSFC;

b) the maximum emission limits for each of the pollutants specified in the relevant permit, typically in gms/BHP hour, tons/yr and lbs/hr;

c) the selected testing parameters, typically the time interval between readings, the number of readings and the emission rate units;

d) various calculation factors, including the ambient pressure, ambient temperature, the K-factor for the fuel gas flowmeter (42), the molar weight of the fuel gas, and the dry fuel F factor, gross calorific value, critical temperature and critical pressure of the fuel gas.

The engine specifications are typically obtained from the engine manufacturer and the engine operator, and typically are manually input by the person conducting the test. The emission limits are typically manually input when the engine is first tested and thereafter the related data are stored in a database record associated with the relevant engine and permit. The testing parameters are either selected by the user and manually input, or are set by a testing protocol associated with the relevant permit, in which case they may be stored in a database record associated with the protocol or permit.

As set out above, the ambient pressure and ambient temperature are typically manually input into the programmed computer (54) which stores the ambient pressure and ambient temperature in the database. The K-factor is either provided by the manufacturer of the fuel gas flowmeter (42) based on the manufacturer's initial calibration of the fuel gas flowmeter (42) or is manually input by the person performing the test to reflect a subsequent recalibration of the fuel gas flowmeter (42).; and The molar weight, dry fuel F factor, gross calorific value, critical temperature and critical pressure of the fuel gas are calculated from an ultimate analysis of the fuel gas, typically obtained from the engine operator. Typically, the calculations are performed by the programmed computer (54) which then stores the results in the database. The dry fuel F factor ($F_d$) is calculated (per EPA 60 CFR 40. Method 19, Eqn. 19–13) as follows:

$$F_d = 10E6[(3.64*\%H)+(1.53*\%C)+(0.57*\%S)+(0.14*\%N)-(0.46*\%O)]/GCV_w \qquad \text{Eqn 4}$$

Where:

%H=Weight Percentage Of Hydrogen From Ultimate Analysis.

%C=Weight Percentage Of Carbon From Ultimate Analysis.

%S=Weight Percentage Of Sulfur From Ultitmate Analysis.

%N=Weight Percentage Of Nitrogen From Ultimate Analysis.

%O=Weight Percentage Of Oxygen From Ultimate Analysis.

The gross calorific value ($GCV_w$) of the fuel gas is calculated (per GPSA Standard 2172-72) as follows:

$$GCV_w = \frac{\sum x_n H_n}{1 \cdot \left(\sum x_n \sqrt{b_n}\right)^2} \qquad \text{Eqn. 1}$$

Where:

$x_n$=Mole fraction of each component.

$H_n$=Gas Hting Value of each component.

$b_n$=Summation Factor of each component.

The critical temperature $T_C$ and critical pressure $P_C$ of the fuel gas are calculated as follows:

$$P_C = \Sigma P_{Cn} * x_n$$

$$T_C = \Sigma T_{Cn} * x_n \qquad \text{Eqn 2}$$

Where:

$P_{cn}$=Critical Pressure of each component.

$T_{cn}$=Critical Temperature of each component.

$x_n$=Mole fraction of each component.

The programmed computer (54) typically also performs pre-test and post-test calculations related to the pre-test and post-test calibration of the sensors, to determine interference response and correction for sensor drift for the sensors. These calculations include:

1. CO Interference Response calculated (per CTM030 Method, Section 6.3.1) as follows:

$$I_{co} = [(R_{co-no}/C_{nog} * C_{nos}/C_{cos}) + (R_{co-no2}/C_{no2g} * C_{no2s}/C_{cos})] * 100 \qquad \text{Eqn 8}$$

Where:

$I_{CO}$=co interference response (%).

$R_{co-no}$=response to NO span gas (ppm CO).

$C_{nog}$=concentration of NO spin gas (ppm NO).

$C_{nos}$=concentration of NO in stack gas (ppm NO).

$C_{cos}$=concentration of CO in stack gas (ppm CO).

$R_{co-no2}$=CO response to NO2 span gas (ppm CO).

$C_{no2g}$=concentration of NO2 span gas (ppm NO2).

$C_{no2s}$=concentration of NO2 in stack gas (ppm NO2).

2. NO Interference Response calculated (per CTM030 Method, Section 6.3.2) as follows:

$$I_{no} = (R_{no-no2}/C_{no2g}) * (C_{no2s}/C_{noxs}) * 100 \qquad \text{Eqn 9}$$

Where:

$I_{no}$=NO interference response (%).

$R_{no-no2}$=NO response to NO2 span gas (ppm NO)

$C_{no2g}$=concentration of NO2 span gas (ppm NO2).

$C_{no2s}$=concentration of NO2 in stack gas (ppm NO2).

$C_{noxs}$=concentration of NOx in stack gas (ppm NOx).

3. Concentration Correction For Sensor Drift calculated (per CTM030 Method, Section 8.1) as follows:

$$C_{GAS} = (C_R - C_O) * C_{MA}/(C_M - C_O) \qquad \text{Eqn 10}$$

Where:

$C_{GAS}$=corrected flue gas concentration (ppm).

$C_R$=flue gas concentration indicated by gas analyzer (ppm).

$C_O$=average of initial and final zero checks (ppm).

$C_M$=average of initial and final span checks (ppm).

$C_{MA}$=actual concentration of span gas (ppm).

Figure 14:
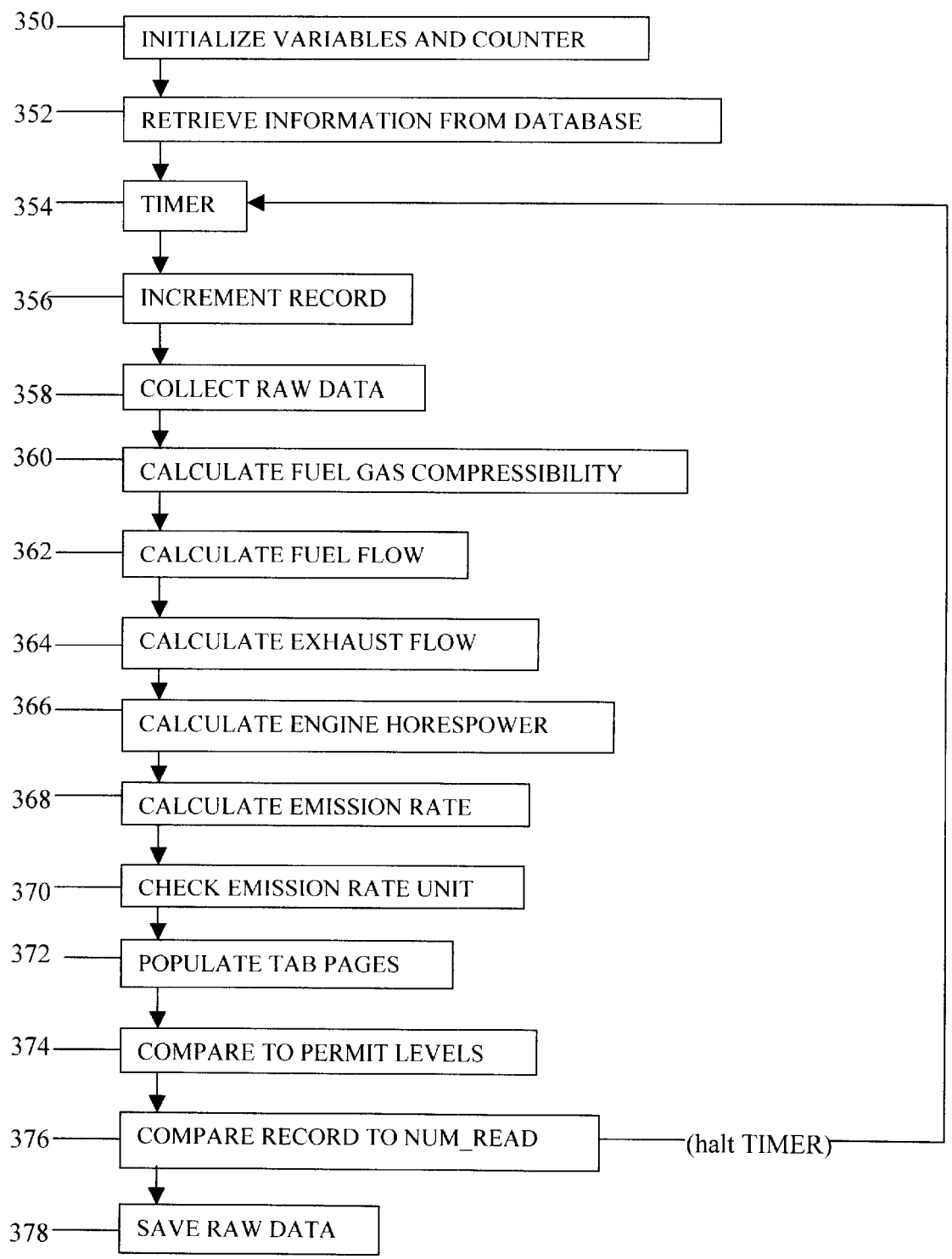
FIG. 14 is a generalized flowchart showing the steps of an emission test (as opposed to the preliminary inputting of data and calibration of sensors) performed with the use of a preferred method according to the invention.

As shown in FIG. 14, when the actual emission test (as opposed to the preliminary inputting of data and calibration of the sensors) commences, the programmed computer (54) performs the stop of INITIALIZE VARIABLES AND COUNTER, which involves initializing (or clearing) the relevant variables and setting a counter (referred to as RECORD) to 0 (350). The programmed computer (54) then performs the step of RETRIEVE INFORMATION FROM DATABASE (352), which entails retrieving the engine specifications, emission limits, testing parameters (including the number of readings, referred to as NUM_READ) and calculation factors from the database).

The programmed computer (54) then starts the TIMER (354) and instructs the TIMER (354) to commence execution of the steps starting with INCREMENT RECORD (356). The TIMER will thereafter periodically commence execution of the steps starting with INCREMENT RECORD (356) at the predetermined time interval between readings (a setting previously obtained from the database) until the TIMER receives instructions to halt.

The step of INCREMENT RECORD (356) entails adding 1 to the RECORD counter.

The programmed computer (54) then performs the step of COLLECT RAW DATA (358), which entails collecting from the data collection buffer (52): the gas analyzer data (typically the sensed relative concentrations of $O_2$, CO, NO, $NO_2$ and $CO_2$, and the NO cell temperature); the intake manifold temperature and pressure; the fuel gas temperature and pressure; and the frequency of pulse counts from the fuel gas flowmeter (42).

The programmed computer then performs the step of CALCULATE FUEL GAS COMPRESSIBILITY (360) which entails calculating the Fuel Gas Compressibility Factor (per GPSA Method, Section 16, Using Standing & Kantz Compressibility Curves). The sensed pressure ($P_{act}$) is divided by the critical pressure of the fuel gas ($P_c$) (previously calculated and obtained from the database) to determine the reduced (corrected) pressure of fuel gas $P_r$. The sensed temperature of the fuel gas ($T_{act}$ is divided by the critical temperature of the fuel gas ($T_C$)) (previously calculated and obtained from the database) to determine the reduced (corrected) temperature of fuel gas ($T_r$).

$$P_r = \frac{P_{act}}{P_C} \quad T_r = \frac{T_{act}}{T_C} \qquad \text{Eqn 3}$$

Where:

$P_r$=Reduced Pressure of fuel gas.

$T_r$=Reduced Temperature of fuel gas.

$P_C$=Critical Pressure of fuel gas.

$T_C$=Critical Temperature of fuel gas.

The reduced pressure and temperature are correlated with the Standing & Kantz compressibility curves using an internal software subroutine to produce the actual compressibility factor.

Although not generally required by EPA methodologies, the programmed computer calculates the compressibility factor of the fuel gas each time it performs the calculations (pursuant to the user's instructions regarding the number of emission analyses to be performed in a particular test and the time interval between each analysis), to provide a corrected volumetric flow rate.

The programmed computer (54) then performs the step of CALCULATE FUEL FLOW (362), which entails calculating the dry volumetric flow rate of the fuel gas corrected for standard conditions and compressibility ($DCSFM_{fuel}$) as follows:

$$DSCFM_{fuel} = \frac{60 * f * [(528/(460 + T_{fuel})) * (P_{amb} + P_{fuel})/29.92]}{z * K} \quad \text{Eqn 5}$$

Where:
- f=Frequency Of Pulses Generated By Turbine Meter.
- Tfuel=Sensed Temperature Of Fuel Gas.
- Pamb=Ambient Pressure.
- Pfuel=Sensed Pressure Of Fuel Gas.
- z=Compressibility Factor Of Fuel Gas.
- K=Pulse Conversion Factor Provided By Turbine Meter Manufacturer The programmed computer (54) then performs the step of CALCULATE EXHAUST FLOW (364), which entails calculating the dry effluent volumetric flow rate (per an extension of EPA 40 CFR 60 Method 19) as follows:

$$Q_{sd} = F_d * HIR * \frac{20.9}{20.9 - \% O_2} \quad \text{Eqn 6}$$

Where:
- Qsd=Dry Effluent Volumetric Flowrate.
- Fd=Dry Fuel F Factor.
- HIR=Heat Input Rate (Fuel Heat Content (GCVw)* Fuel Usage Rate (DSCFMfuel))
- O2=Oxygen Content Of Effluent Gas (Used For Excess Air Correction).

The programmed computer (54) then (or possibly before any or all of steps 360, 362 and 384, or, alternatively, concurrently with any or all of steps 360, 362 and 364) performs the step of CALCULATE ENGINE HORESPOWER (366), by one of three possible alternative methods, previously selected by the person performing the test, as follows:

1. By correlating engine data, typically the values of intake manifold pressure, intake manifold temperature, engine model and engine RPM with the engine manufacturer's load curve. Discrete values not found on the engine manufacturer's load curve are calculated using Newton's Method of Interpolation. The data from each load curve are incorporated into a computer routine (referred to as a function) along with Newton's Method of Interpolation, such that the programmed computer may "call the function", that is, provide a particular routine with values for the required variables and instruct the routine to calculate the engine load.
2. By using the engine manufacturers brake specific fuel consumption (BSFC) (previously obtained from the database) as follows:

$$BHP = HIR/BSFC \quad \text{Eqn 11}$$

Where:
- HIR=Heat Input Rate (BTU/hr)(Fuel Heat Content (GCVw)*Fuel Usage Rate (DSCFMfuel))
- BSFC=Brake Specific Fuel Consumption Published By Engine Manufacturer (BTU/BHP-hr).

3. By correlating the engine RPM with the engine manufacturer's specifications. If this method is selected, then, since the RPM does not vary during the test, the engine load determined by this method remains constant throughout the test and need not be determined for each iteration of the test steps. The engine load is merely retrieved from the database, held in the programmed computer's (54) local memory and assigned as the result of the CALCULATE ENGINE HORESPOWER (366) step.

The programmed computer (54) then performs the step of CALCULATE EMISSION RATE (368) which entails calculating the emission rate (per CARB 100 Method) of each of the relevant pollutants, as follows:

$$ERP = 1.56E-7 * PPM * Q_{sd} * MW \quad \text{Eqn 7}$$

Where:
- ERP=Emission Rate Of Pollutant (lbs/hr).
- PPM=Concentration Of Pollutant.
- Qsd=Dry Effluent Volumetric Flowrate.
- MW=Molar Weight Of Pollutant.

The CALCULATE EMISSION RATE (368) step yields units of lbs/hr. The molar weight of each pollutant is a constant. The molar weight of each pollutant may be stored in the database or, preferably, may be incorporated in the program of the programmed computer.

The programmed computer (54) then performs the step of CHECK EMISSION RATE UNIT (370), which entails; checking if the preferred emission rate unit (either previously obtained from the database or entered by the user during the test) is lbs/hr; and, if the preferred unit is not lbs/hr, converting the emission rate to the preferred unit or dividing the emission rate by the engine load to obtain gr/BHP-hr or gr/KW-hr, if such is preferred.

The programmed computer (54) then performs the step of POPULATE TAB PAGES (372), which entails adding the raw and calculated data to various tab pages viewable on a display screen (not shown) associated with the programmed computer (54) to enable the user to view the data in real time. Alternatively, or concurrently, the programmed computer could send the data to a printer so as to continuously print the data during the test.

The programmed computer (54) then performs the step of COMPARE TO PERMIT LEVELS (374), which entails comparing the calculated emission rate of each pollutant with the maximum permitted emission rate (previously obtained from the database), and, if the calculated emission rate for a pollutant is above the maximum permitted emission rate, notifying the user of this, preferably by an indication on the display screen or alternatively by generating an audible alarm. Preferably the programmed computer (54) also notifies the user, in a similar though distinguishable manner, when a calculated emission rate is 90% or more of the maximum permitted emission rate.

The programmed computer (54) then performs the step of COMPARE RECORD TO NUM_READ (376), which entails comparing the RECORD counter to the preferred number of readings (NUM_READ) (previously obtained from the database), If RECORD is less than NUM_READ then the TIMER is permitted to continue commencing execution of the steps commencing with INCREMENT RECORD (356). If RECORD is equal to NUM_READ then the TIMER is halted.

The programmed computer (54) then performs the step of SAVE RAW DATA (378), which entails saving the raw data to the database for subsequent preparation of a formal emission report.

Figure 4:
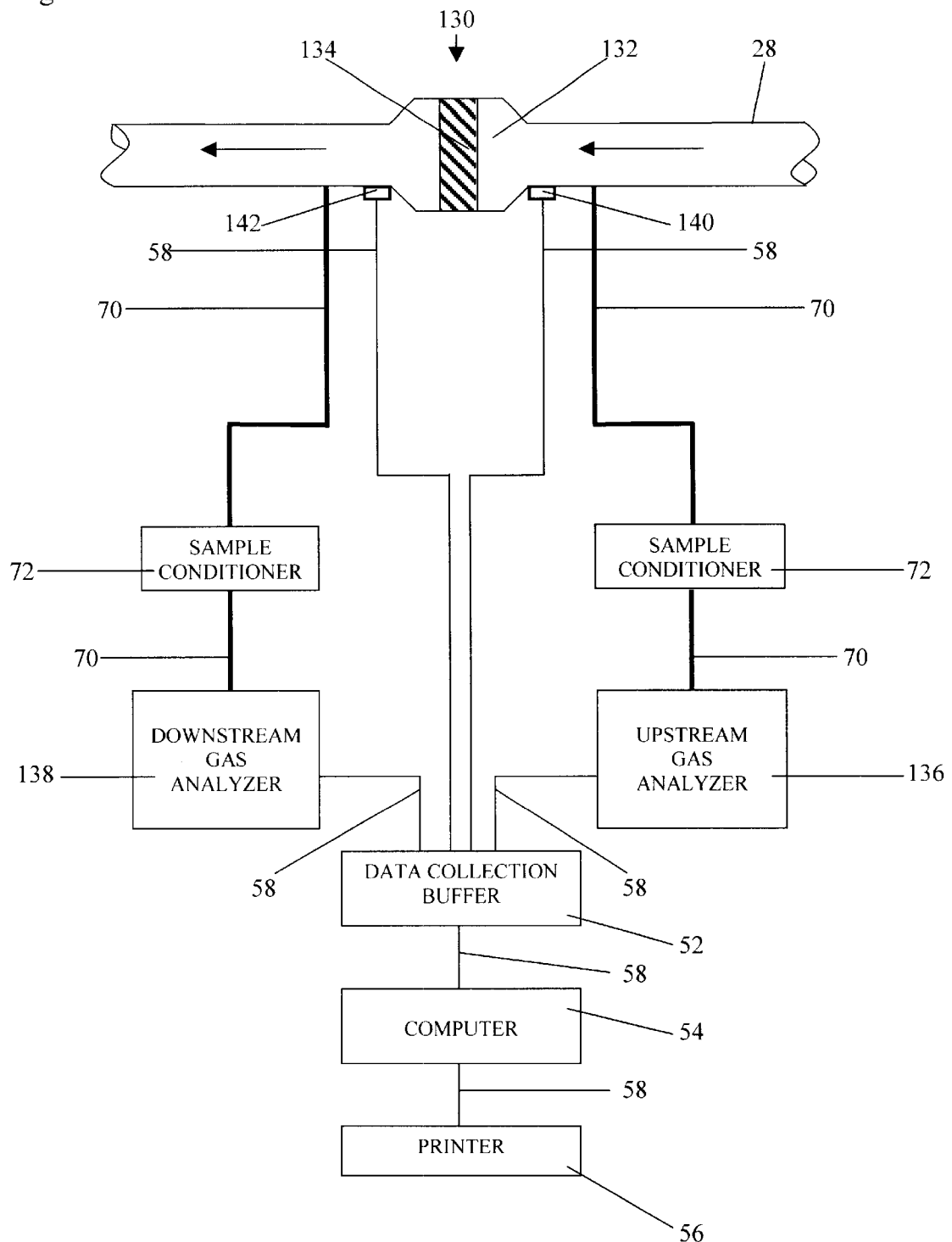
FIG. 4 is a schematic block diagram of the engine emission analyzer of FIG. 1 configured for evaluating the effectiveness of a catalytic converter.

As shown in FIG. 4, another embodiment of the engine emission analyzer (22). comprising two gas analyzers and two exhaust stack temperature sensors, is useful for testing the effectiveness of catalytic converters (130) in reducing pollution. Catalytic converters (130) are often installed in-line in the exhaust stack (28). In use, exhaust gas enters the catalytic convertor chamber (132) and passes through a catalyst element (134) of either ceramic or metallic composition. An exothermic chemical reaction occurs through the catalyst element (134) which reduces the levels of NO, $NO_2$ CO and $CO_2$, and increases the downstream exhaust temperature. The catalytic convertor (130) may not function at peak reduction efficiency due to a number of reasons, such as: an incorrect air/fuel ratio setting; masking of the catalyst element (134) with sulphated ash from the engine lubricating oil; an exhaust temperature that is too low; or partial destruction of the catalyst element (134) due to an engine backfire. It is often desirable to be able to test the efficiency of the catalytic converter (130).

For the purpose of testing the efficiency of a catalytic converter (130), it is useful to simultaneously measure the concentrations of the test gases, and the temperature of the exhaust gas, upstream and downstream of the catalytic converter (130). A preferred embodiment utilizes two gas analyzers (40), an upstream gas analyzer (136), which draws exhaust gas from upstream of the catalytic converter (130) and a downstream gas analyzer (138) which draws exhaust gas from downstream of the catalytic converter (130). As well, it is useful to obtain temperature measurements upstream and downstream of the catalytic converter (130). A preferred embodiment utilizes two temperature sensors: an upstream temperature sensor (140) which sense the exhaust temperature upstream of the catalytic converter (130) and a downstream temperature sensor (142) which senses the exhaust temperature downstream of the catalytic converter (142).

In one embodiment, suitable for testing catalytic converters (130), the data collection buffer (52) includes a second gas analyzer serial port (100) as shown in FIG. 2. The data collection buffer (52) uses the same procedure to recognize and extract data from each of the upstream gas analyzer (136) and the downstream gas analyzer (138), as it uses when only one gas analyzer (40) is present. When the data collection buffer (52) is connected to two gas analyzers for the purpose of testing a catalytic converter (130), the microprocessor (90) repeatedly extracts data from the gas analyzers one after the other (typically, first the upstream gas analyzer (136) and then the downstream gas analyzer(138)) and stores the data in the SRAM. Once the microprocessor (90) has retrieved and stored the data from both gas analyzers, the microprocessor (90) stops receiving data from the gas analyzer serial ports (100). The microprocessor (90) then retrieves the data representing measurements from the upstream temperature sensor (140) and the downstream temperature sensor (142). The microprocessor (90) then stores these data in SRAM. The microprocessor (90) then formats the gas analyzer and other sensor data and sends the data to the programmed computer (122). The microprocessor (90) then resumes receiving data from one of the gas analyzer serial ports (110) and the cycle is repeated.

One measure of an engine's efficiency is its brake specific fuel consumption (BSFC) rating. The BSFC indicates an engines rate of fuel consumption per unit of engine load. A lower BSFC indicates that an engine is more fuel efficient than an engine with a higher BSFC. The BSFC is typically calculated by dividing the fuel consumption rate by an approximated engine load. A feature of a preferred embodiment of the engine emission analyzer is that it determines in real time the fuel usage rate and the engine load as part of the engine emission analysis. In one embodiment the invention calculates and displays the engine BSFC in real time, which helps a user tune an engine (20) in an attempt to reduce the BSFC.

Figure 5:
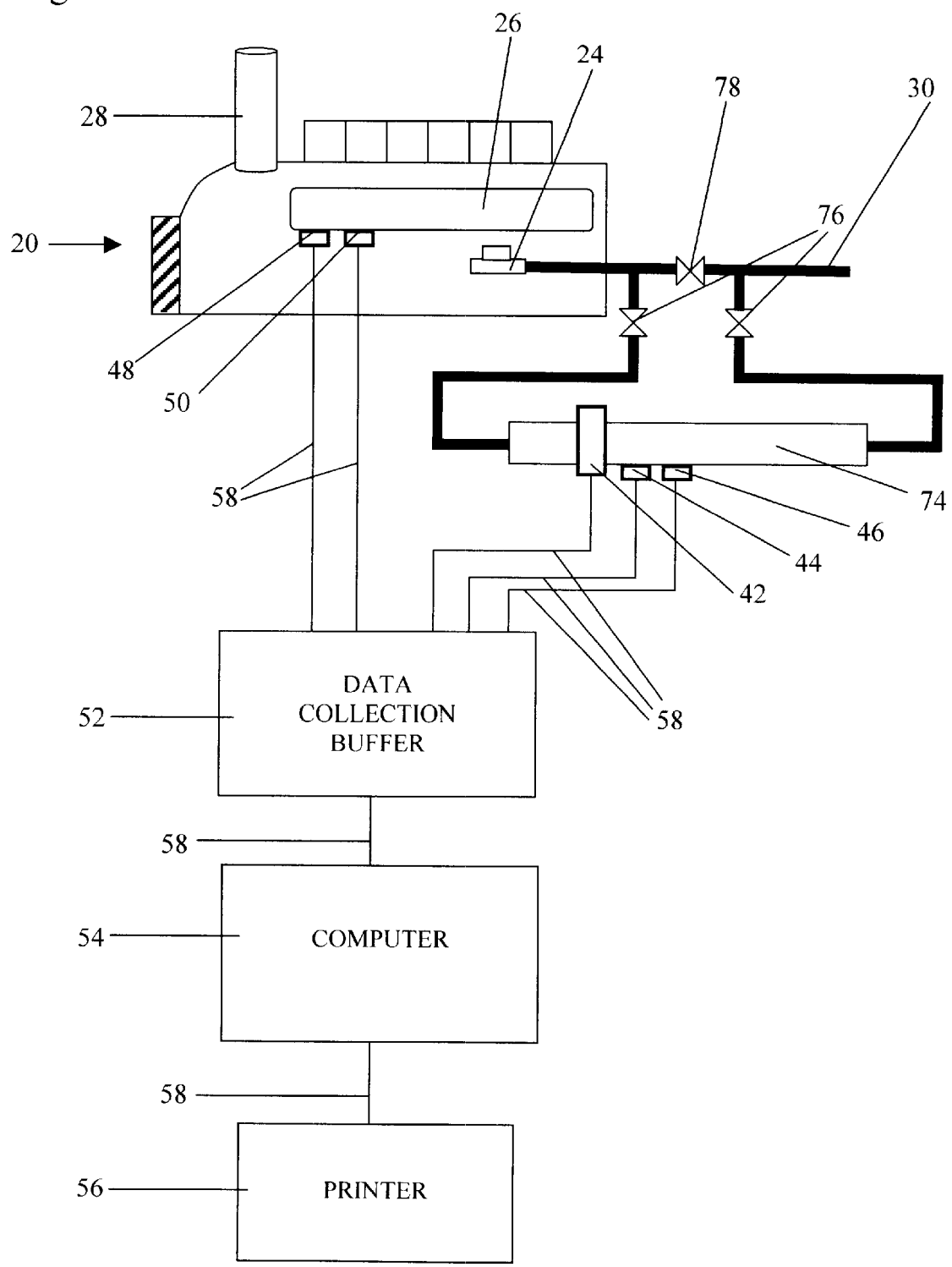
FIG. 5 is a schematic block diagram of the engine emission analyzer of FIG. 1 configured for determining the brake specific fuel consumption of the engine being tested, for the purpose of optimizing engine performance.

During an emission test in which the engine load is being approximated on the basis of intake manifold pressure and temperature, the programmed computer (54) is receiving the data necessary to approximate the BSFC, and can be programmed to approximate the BSFC as part of the emission test. Alternatively, as shown in FIG. 5, only those sensors making the measurements necessary for calculating the BSFC need be connected to the engine, being: an intake manifold pressure sensor (48); an intake manifold temperature sensor (50); a fuel gas flowmeter (42); a fuel gas temperature sensor (46); and a fuel gas pressure sensor (44).

In a preferred embodiment of the invention, the programmed computer has a display screen and runs a program, WinStack™, created by the inventors, which incorporates the relevant testing protocol and uses the emission limits from the relevant permit to ensure that the test results comply with the permit requirements and the test protocol. WinStack™ is a Windows™ based system containing executable files and incorporating a 32 bit Sybase database platform. WinStack™ will run on Windows™ 32 bit platforms, such as Windows 95™ & Windows 98™, but Winstack™ hasn't been certified on Windows 2000™ or Windows NT™. WinStack™ requires a computer having at least a Pentium™ 133 MHz processor and 32 Mb of RAM, and with an SVGA type monitor. WinStack™ requires at least 50 Mb of hard disk space in order to operate correctly.

Figure 6:
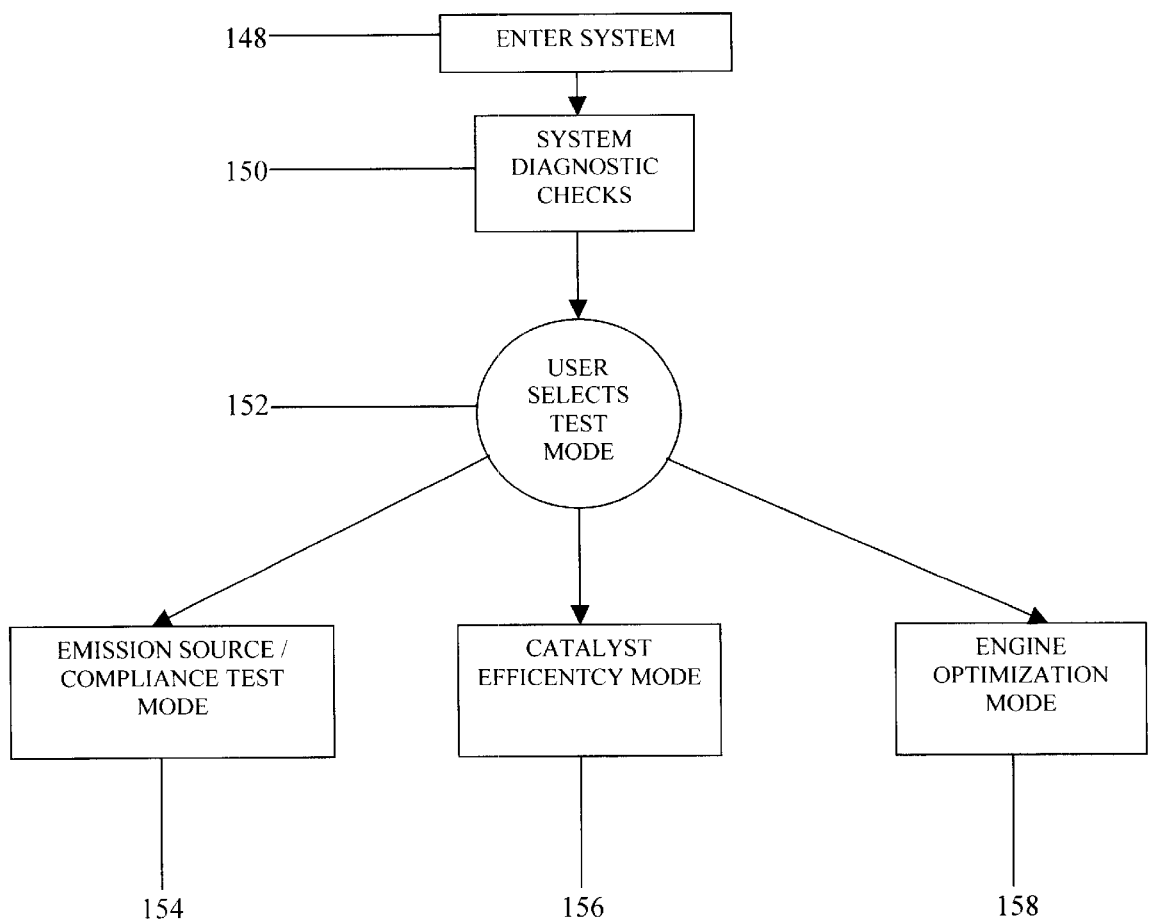
FIG. 6 is a flowchart showing initial steps of a preferred implementation of a method according to the invention, preferably using WinStack™ software that is suitable for use in performing computations according to the method of the invention.

As shown in FIG. 6, after WinStack™ is started and entered (148), it performs system diagnostic checks (150).

Engine emission test protocols typically specify that each gas sensor be calibrated using a gas, referred to as the span gas, with a known concentration of the gas that the sensor is designed to detect, that is, the target gas. The test protocols also typically specify that the concentration of the target gas in the span gas used in the calibration checks must be within a set range. The bounds of this range are defined in terms of the concentration of the target gas in the actual exhaust being tested. For example, the upper range of the allowable span gas concentration is roughly three times the concentration of the target gas in the exhaust stream. Conventionally, the person conducting the test obtains the concentrations of the target gases with un-calibrated sensors and uses the un-calibrated sensed concentrations of the target gases as guides to the selection of appropriate span gases. Typically, the person testing the exhaust has several span gas bottles with different concentrations of target gases to choose from.

The system diagnostic checks (150) performed by WinStack™ include checking the measurements being received from the CO, NO, $NO_2$ and $O_2$ sensors for the purpose of determining an appropriate span gas for the calibration of the sensors. WinStack™ calculates an approved span gas range for each sensor.

WinStack™ then prompts the user to select a test mode (152), either: Emission Source/Compliance (154); Catalyst Efficiency (156) or Engine Optimization (158).

"Source" and "compliance" are terms used by regulators to distinguish different test criteria. A source test generally has a more rigorous test protocol than a compliance test. A permit for a particular engine might specify that a compliance test be conducted every six months and a source test every four years.

The Catalyst Efficiency test mode (156) is used to test the effectiveness of catalytic converters. The Engine Optimization test mode (158) is used to approximate the BSFC for the purpose of tuning an engine.

Figure 7:
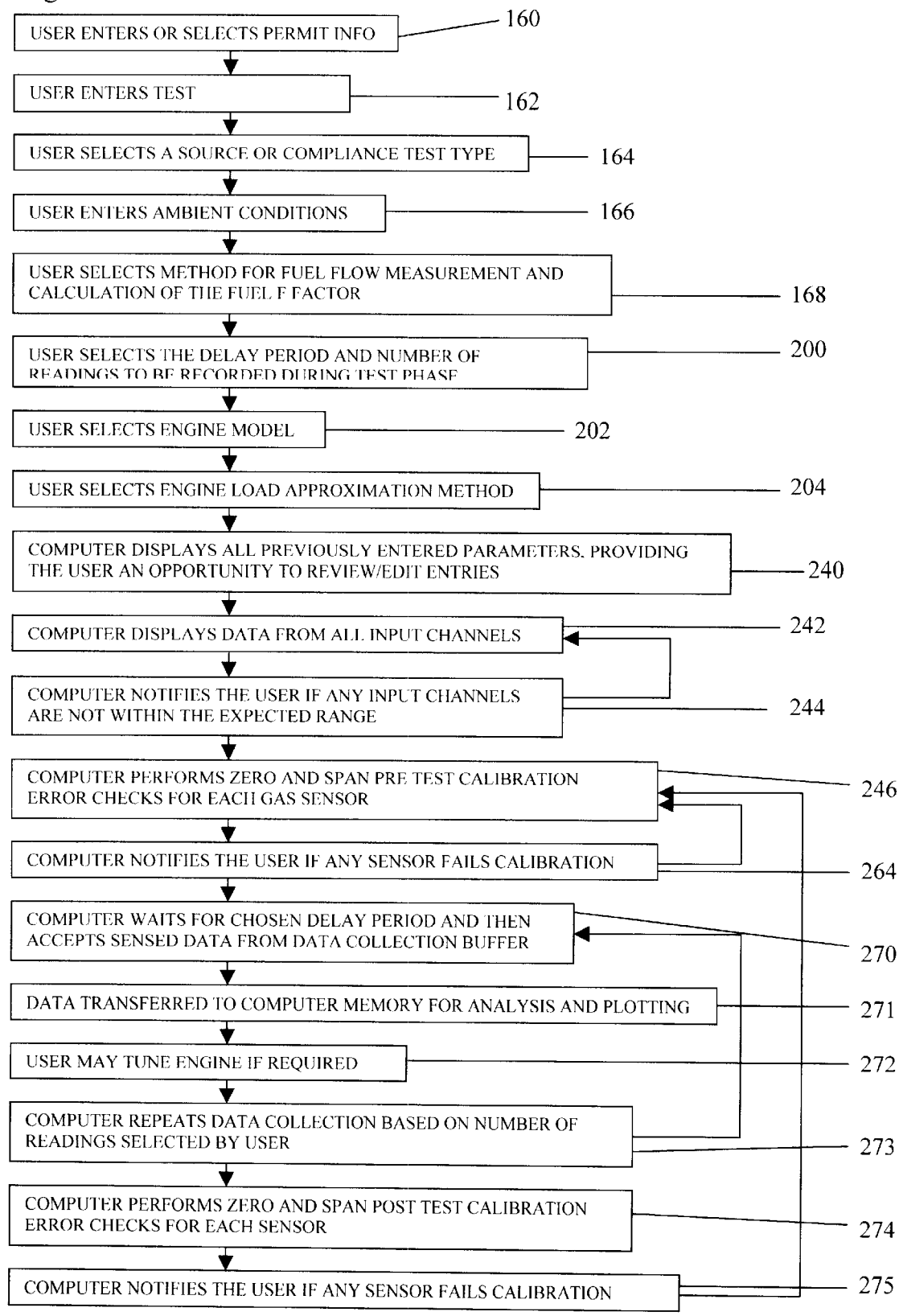
FIG. 7 is a flowchart showing steps of the Emission Source/Compliance test mode of use of the WinStack™ software, in accordance with a preferred implementation of a method according to the invention.

As shown in FIG. 7, when the user selects the Emission Source/Compliance test mode (154), the user is prompted to enter the relevant permit information data, or select the permit information data from the WinStack™ database if the permit information data have been previously entered into the computer (160). The permit information data stored by the WinStack™ database include the state or province in or for which the permit has been issued, the date upon which the most recent previous test was performed, the permitted emission levels and units, and the maximum permitted time between each source or compliance test. WinStack™ compares this data with the measured emission levels during the test and indicates any breach of the permit requirements. WinStack™ also notifies the user of any upcoming emission tests, based on the permit number, the state or province, and the time since the last test.

WinStack™ then prompts the user to enter, into the appropriate fields, the following data the facility location, the relevant environmental board; the gas analyzer serial number; the facility operator; and an identifier for the person performing the emission test (162). The user then indicates whether a Source or Compliance test will be performed (164). The user then enters the ambient conditions at the test site (166). The ambient conditions are the ambient barometric pressure and ambient temperature which are measured by any suitable means.

WinStack™ then prompts the user to select a method for determining the fuel gas volumetric flow (168).

Figure 8:
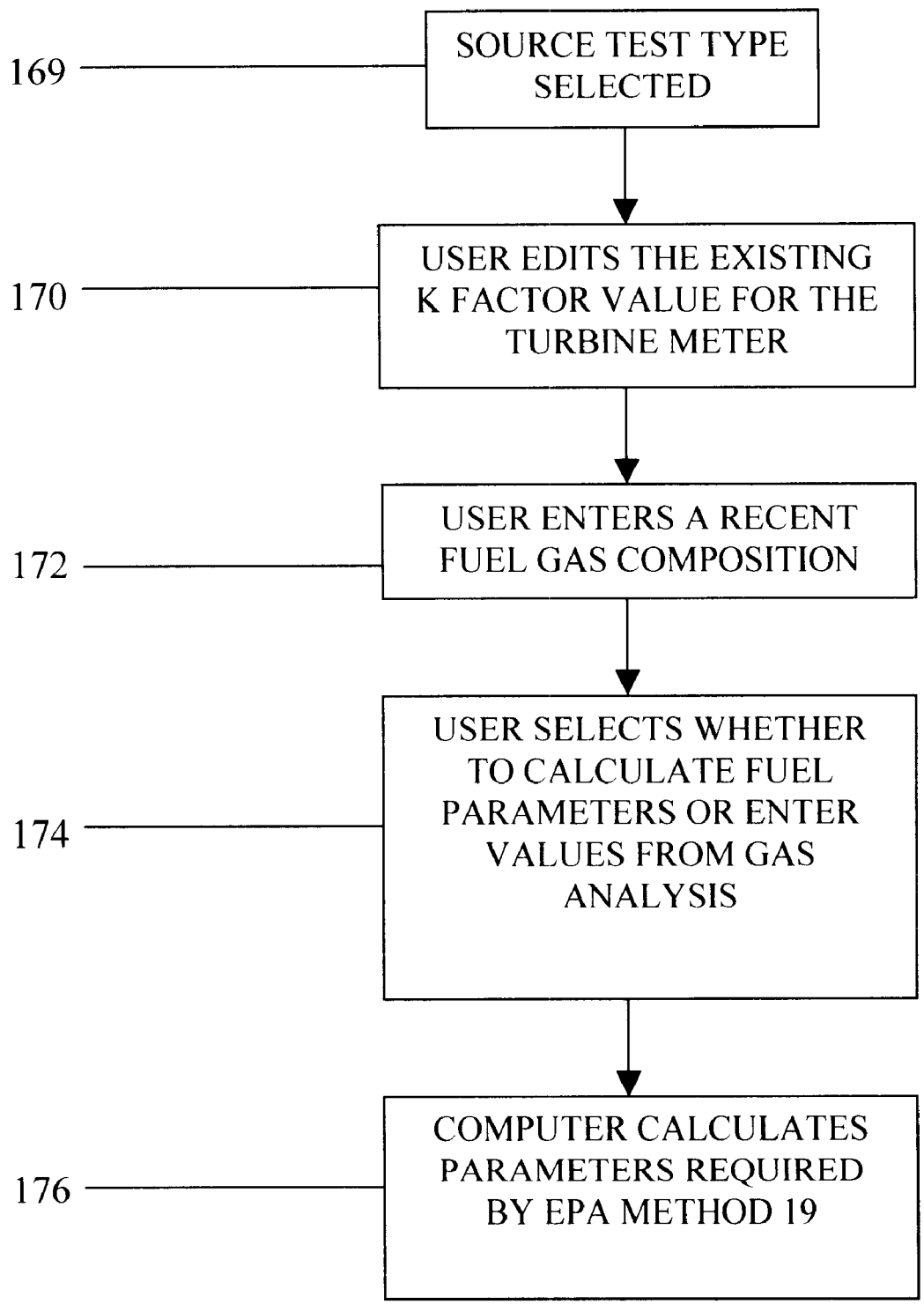
FIG. 8 is a flowchart showing fuel measurement and fuel factor calculation steps of the Source test mode of use of the WinStack™ software, in accordance with a preferred implementation of a method according to the invention.

If the user selected a Source test in a previous step (169), then WinStack™ will require real-time fuel gas volumetric flow, fuel gas temperature and fuel gas pressure measurements. Therefore, for a Source test, it is necessary to divert the fuel gas through a fuel metering system. As shown in FIG. 8, WinStack™ prompts the user to indicate the model of flowmeter being used to measure the fuel gas volumetric flow and to either enter a K-factor or edit the K-factor displayed by WinStack™ based on the most recent calibration of the flowmeter (170). WinStack™ then prompts the user to enter a recent fuel gas composition (172). WinStack™ then permits the user to either: enter the gross calorific value and the molecular weight of the fuel, typically from a fuel gas composition sheet; or enter the various mole fractions of the components of the fuel gas (obtained from an earlier analysis of the fuel gas) (174) in which case WinStack™ will calculate gross calorific value and the molecular weight of the fuel. WinStack™ then calculates the mass percentages of Carbon, Oxygen, Sulfur, Nitrogen, Hydrogen, the pseudo critical properties and the fuel F Factor (176). All data calculated and recorded during this step is saved to the WinStack™ database for later retrieval and report generation.

Figure 9:
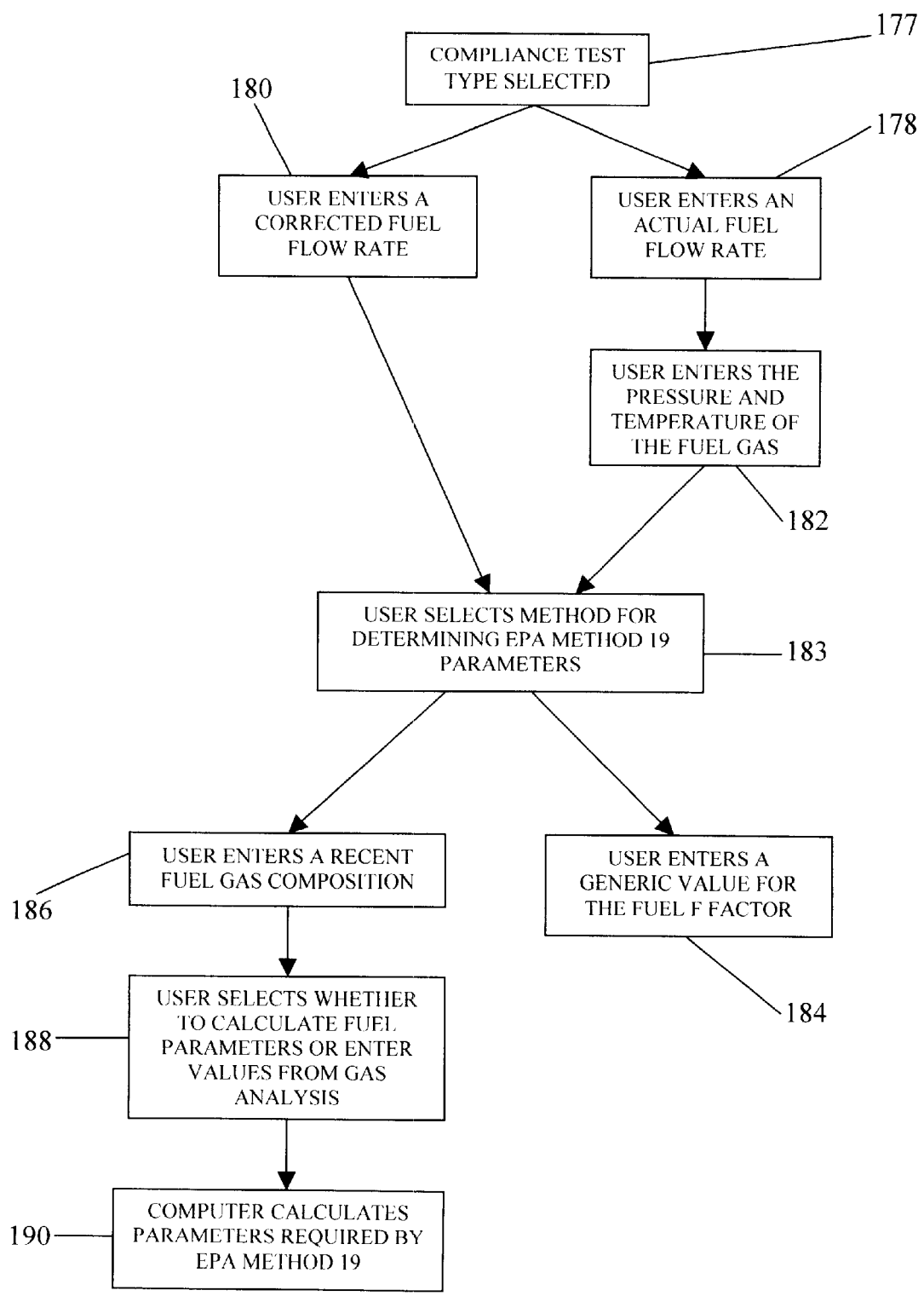
FIG. 9 is a flowchart showing fuel measurement and fuel factor calculation steps of the Compliance test mode of the use of the WinStack™ software, in accordance with a preferred implementation of a method according to the invention.

As shown in FIG. 9, if a compliance test was selected in a previous step (177), then WinStack™ prompts the user to enter a static value for the fuel volumetric flow rate, generally based on a measurement from a flowmeter or a similar estimation. The volumetric flow rate must be corrected for temperature and pressure. WinStack™ permits the user to enter either an actual fuel flow rate (178) as directly measured by the relevant metering device; or an already corrected fuel flow rate (180). If the user elects to enter a corrected flow rate, the user simply types in the corrected volumetric flow rate. If the user elects to enter an actual flow rate, then the user must enter the fuel flow, pressure and temperature (182). WinStack™ then converts the actual flow to a corrected flow based on the entered temperature and pressure. The user then selects (183) between entering a generic fuel F factor (184) or having WinStack™ calculate the fuel F factor based on the fuel gas composition. If the user enters a generic fuel F factor (184), WinStack™ estimates a generic value for the gross calorific value of the fuel (1000 Btu/cf). If the user elects to calculate the fuel F factor based on the fuel gas composition, then the user enters the fuel gas composition data (186). The user may then select for the programmed computer to calculate the fuel parameters or the user may enter the parameters from a gas analysis, if they are available (188). WinStack™ then calculates the parameters required by EPA method 19 (190).

As shown in FIG. 7, for both the Compliance and Source test modes, the user is then prompted to set the total number of measurements recorded during each test and the time interval between each reading (200).

WinStack™ then prompts the user to select the relevant engine model for the test (202). WinStack™ lists engine models based on the manufacturer, aspiration (natural or turbocharged) and combustion (rich burn or lean burn).

Depending on the selected engine model, WinStack™ then permits the user to select from three methods for approximating the engine load (204). Load can be approximated based on the manifold conditions (208), the manufacturer's rated brake specific fuel consumption (BSFC, typically in BTU/BHP-hr) (214), or the manufacturers rated engine load for specified engine RPM (226).

Figure 10:
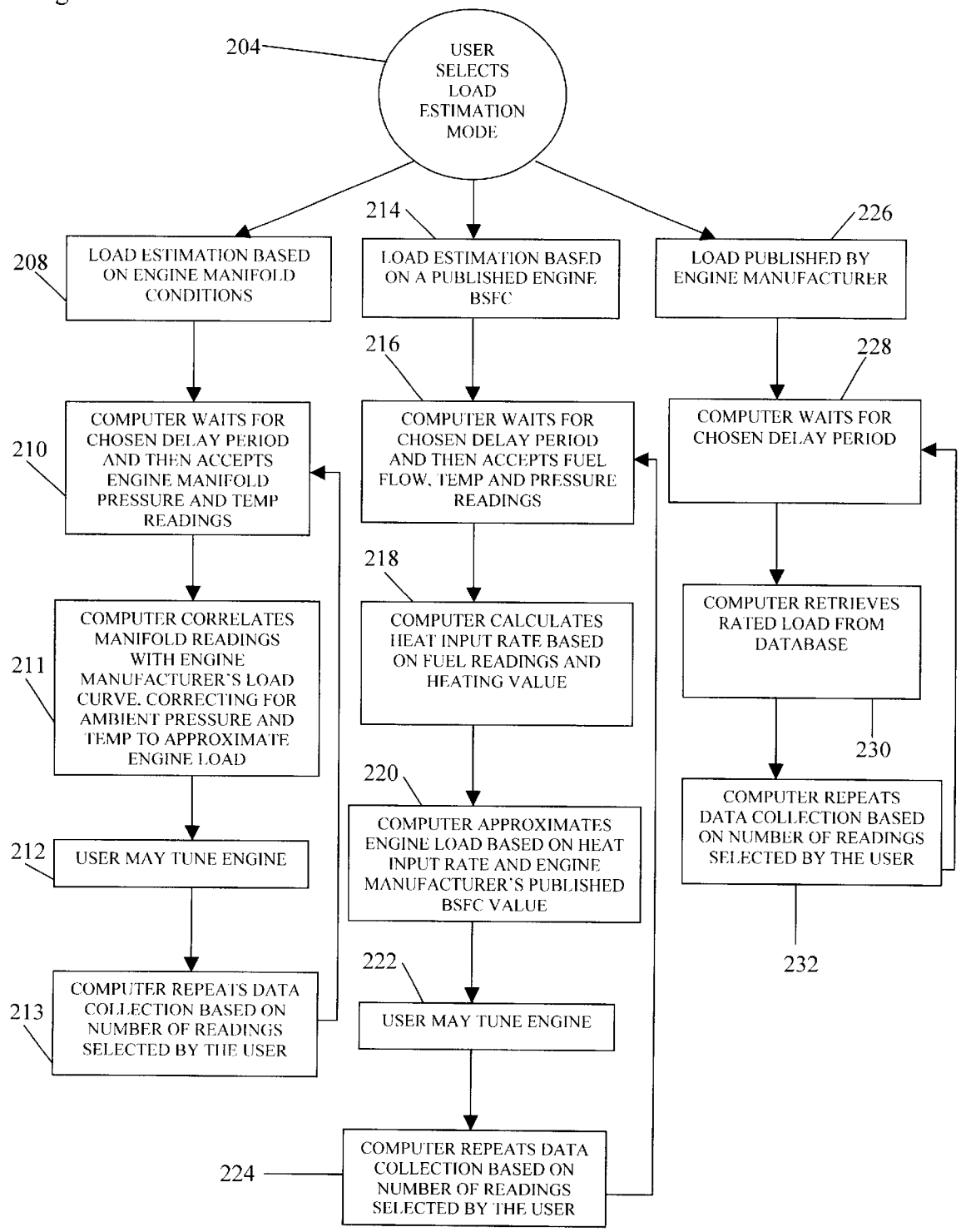
FIG. 10 is a flowchart showing engine load approximation steps of the use of the WinStack™ software, in accordance with a preferred implementation of a method according to the invention.

As shown in FIG. 10, if the user elects to approximate the engine load from manifold conditions (208) in data acquisition mode, WinStack™ waits for the chosen delay period and then accepts engine manifold pressure and temperature readings (210). Then WinStack™ correlates the measured intake manifold temperature and pressure with the engine manufacturer's load curves (which relate intake manifold pressure and temperature with engine load) and corrects for ambient temperature and barometric pressure (already entered by the user) per the manufacturers guidelines (211). WinStack™ uses Newton's Interpolation Method to approximate the engine load at temperature and pressure measurements that do not fall at the discrete points defined by the load curve representations. The user may tune the engine (212). WinStack™ repeatedly accepts intake manifold temperature and pressure measurements and repeats the above calculations based on the number of measurements selected by the user (213).

As shown in FIG. 10, if the user elects to approximate the engine load with the manufacturer's brake specific fuel consumption (BSFC) (214), in data acquisition mode, WinStack™ waits for the chosen delay period and then accepts fuel flow, fuel temperature and fuel pressure measurements (216). WinStack™ then calculates the heat input rate from the corrected fuel volumetric flow rate and the gross calorific value of the fuel (218). WinStack™ then approximates the engine load (typically BHP) based on the heat input rate (typically Btu/hr) and the manufacturer's published BSFC values (typically Btu/BHP-hr) (220). The user may tune the engine (222). WinStack™ repeatedly accepts fuel flow, fuel temperature and fuel pressure measurements and repeats the above calculations based on the number of measurements selected by the user (224).

As shown in FIG. 10, if the user elects to approximate the engine load from the manufacturers engine load for specified engine RPM ratings (226), then the user enters the engine RPM. In data acquisition mode, WinStack™ waits for the chosen delay period and then selects and retrieves a rated load from the manufacturers engine load in the database, corresponding to the entered RPM (230). WinStack™ repeats the above approximation based on the number of measurements selected by the user (232).

As shown in FIG. 7, WinStack™ then checks for blank entries or erroneous inputs, and displays the previously entered testing parameters (240), so as to permit the user to adjust or correct any values through a 'Preferences' section of the menu. Once the user confirms via the computer program interface that the entries are satisfactory, WinStack™ goes into the data acquisition mode.

WinStack™ then displays all the data channels coming from the data collection buffer (242). The display is configured so as to make a viewer aware of any unexpected inputs (ie: inputs that are not within the expected channel ranges) (244), so as to permit the user to remedy a faulty sensor, or correct a situation where a sensor has not been installed or connected properly.

As shown in FIG. 7, when the user is satisfied that all sensors are reading correctly, the user instructs WinStack™ to commence the pre-test calibration error phase (246). WinStack™ requires the user to follow standard United States Environmental Protection Agency ("EPA") procedures to ensure that the gas analyzer correctly reads the gas concentration levels for NO, NO2, CO & O2. The sensors in the gas analyzer are also calibrated after the emission test.

Figure 11:
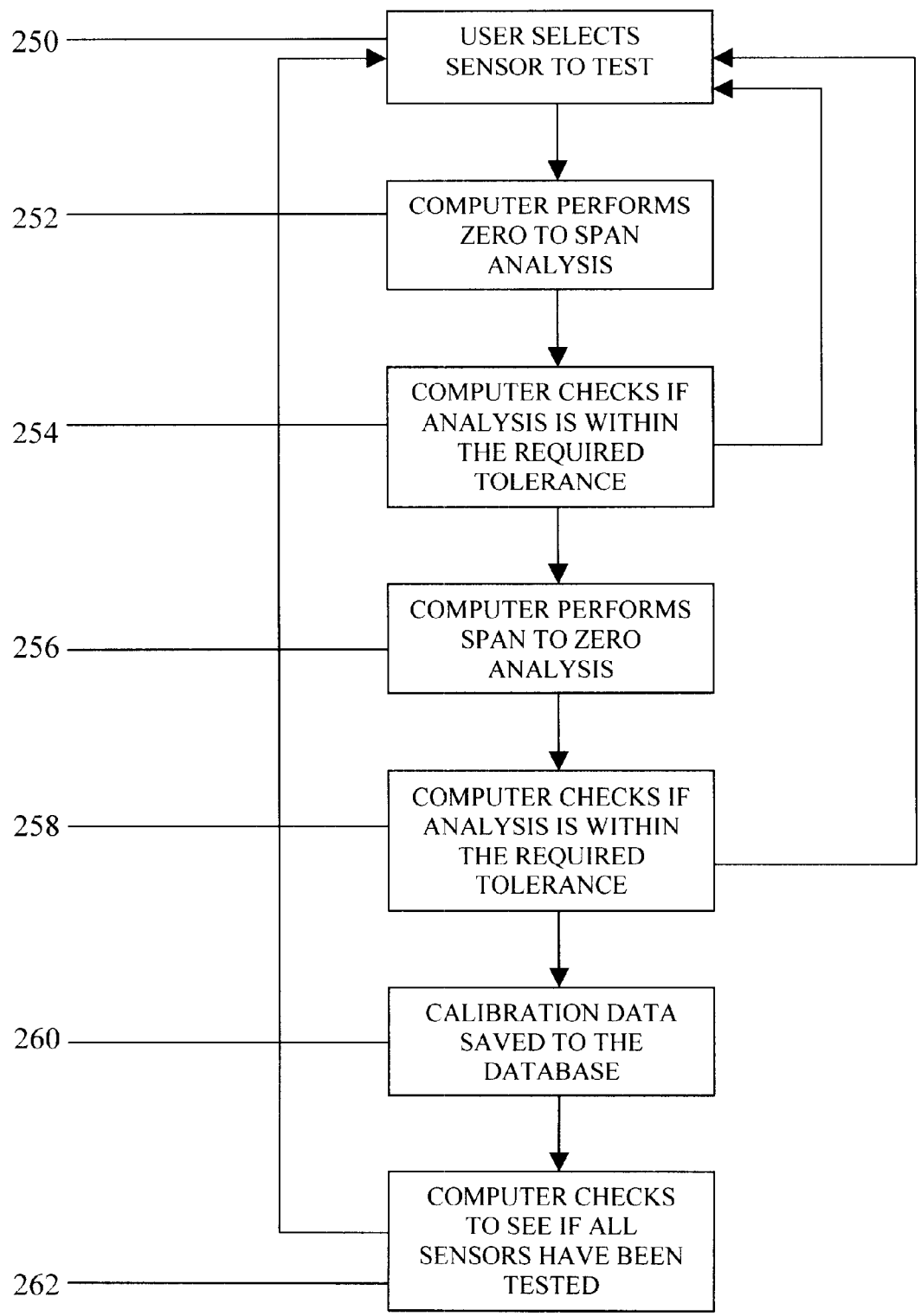
FIG. 11 is a flowchart showing calibration error test steps of the use of the WinStack™ software, in accordance with a preferred implementation of a method according to the invention.

FIG. 11 shows the calibration error procedure used for both the pre-test calibration error phase and the post-test calibration error phase.

The individual gas sensors in the gas analyzer are each tested by exposing them to a gas, referred to as a span gas or calibration gas, containing a known concentration of the gas which each is designed to detect. The testing of each gas sensor involves two phases: the zero to span phase; and the span to zero phase. In the zero to span phase, the gas sensor is exposed to ambient air and then to the span gas. In the span to zero phase, the sensor is exposed to the span gas and then to the ambient air.

The user first selects one of the gas sensors to test (250). The user connects the appropriate span gas cylinder to the gas analyzer and then performs a zero to span analysis (252). During the zero to span analysis, WinStack™ compares the actual data received from the gas analyzer, with the known span gas concentration, typically stamped on the calibration gas cylinder. The time it takes a gas sensor to respond to 95% of the step change from zero to span or span to zero, is referred to as the response time of the gas sensor. After the gas sensor has sensed 95% of the step change from zero to span, WinStack™ will compare the gas sensor measurements to the known concentration of the target gas in the span gas to determine if the gas sensor measurement is within the EPA tolerance (254). If the reading is not within the EPA tolerance, WinStack™ will require the user to conduct another zero to span test of the sensor (264).

Once the sensor has passed the zero to span test, WinStack™ requires the user to perform a span to zero test on the sensor (256). The user must disconnect the gas analyzer from the span gas cylinder, allowing the analyzer to sample ambient air, which is the zero reference. After the gas sensor has sensed 95% of the step change from span to zero, WinStack™ will compare the gas sensor measurements to the known concentration of the target gas in the ambient air to determine if the gas sensor measurement is within the EPA tolerance (258) If the reading is not within the EPA tolerance, WinStack™ will require the user to re-test the sensor (including the zero to span test). If the reading is within the required EPA tolerance, WinStack™ saves all the raw data for both the span to zero and zero to span tests to the database (260). The user then conducts the same tests of the remaining sensors. WinStack™ checks that all the sensors have been tested (262). Once all the sensors have passed the pre-calibration error test, the user proceeds to the testing phase.

When the testing phase is entered, WinStack™ prompts the user to select either line or bar graph format for real-time graphical display purposes. WinStack™ then prompts the user to select between two modes: "Tune Engine" and "Start Test". The "Tune Engine" option allows the user to view all real-time levels (engine emission, engine load, engine exhaust and fuel consumption levels) without saving any data to the database. The purpose of this mode is to provide an opportunity to the user to tune or adjust the engine to be compliant with the permit emission limits. The "Start Test" option allows the user to view all levels, and records all raw data to the database for eventual report generation. Prior to initiating the "Start Test" mode, most users will generally have already made an attempt to tune the engine to meet the compliance requirements of the permit.

The only significant difference between the "Tune Engine" and "Start Tests" modes is that in the "Start Test" mode all raw data is saved to the database, whereas in the "Tune Engine" mode no data is saved to the database. The description that follows refers to the "Start Test" mode, but it also applies to the "Tune Engine" mode.

As shown in FIG. 7, in the "Start Test" mode, raw data is obtained from the data collection at the time intervals previously stipulated by the user (270). The raw data is forwarded to WinStack™ from the data collection buffer in a specific format and sequence. The data is transferred to the computer memory for analysis and plotting (271). This raw data is converted to standard engineering units by WinStack™.

Depending on the load approximation method previously selected by the user [28] WinStack™ approximates the engine load using: pressure and temperature measurements (engine manifold method); corrected fuel flow measurements (engine BSFC method); or the manufacturer's rated load. WinStack™ calculates the real-time fuel gas compressibility with a subroutine that uses the Standing and Kantz compressibility curve approximation method utilizing calculated pseudo critical gas properties and the measured fuel gas temperature and pressure. Persons skilled in the art of petroleum engineering will be familiar with the Standing and Kantz method.

WinStack™ calculates the exhaust flow rate based on the type of testing that was previously selected by the user. If the user selected a Source test, WinStack™ takes the actual fuel flow and corrects it for pressure, temperature and compressibility to arrive at a corrected fuel flow. This value, coupled with other previously calculated values (ie: the Fuel F factor, the Gross Calorific Value etc.) is then used to calculate the real-time exhaust flowrate If the user selected a Compliance test, WinStack™ uses the previously entered static value for the fuel flow.

WinStack™ calculates the emission levels based on the user selected engineering unit, the measured concentration levels, and the exhaust flow calculation. WinStack™ calculates the engine fuel consumption and the engine BSFC in real-time, based on the fuel gas volumetric flow measurement and the engine load approximation. WinStack™ presents the user with: real-time emission levels, the engineering units of which may be changed at any time through a menu selection; a corrected fuel flow measurement; an approximated engine load; a calculated exhaust flow; the engine brake specific fuel consumption (BSFC); and all raw data readings on individualized windows-style tab pages. The user may make adjustments to the engine and view resultant levels in real-time (272). WinStack™ repeats the data collection based on the number of readings selected by the user. (273). Then the post-calibration error check is performed (274), using the same procedure as the pre-calibration error check (FIG. 11). WinStack™ notifies the user if any sensors fail the post-test calibration check (275).

Once the test is complete, all raw data is saved to the database to allow report generation at a time of the user's choosing.

As shown in FIG. 4, when the user wishes to use the Catalyst Efficiency test mode, two gas analyzers are used: an upstream gas analyzer (136), which draws exhaust gas from upstream of the catalyst element (134) and a downstream gas analyzer (138) which draws exhaust gas from downstream of the catalyst element (134). As well, two temperature sensors are used: an upstream temperature sensor (140) which senses the exhaust temperature upstream of the catalyst element (134) and a downstream temperature sensor (138) which senses the exhaust temperature downstream of the catalyst element (134).

Figure 12:
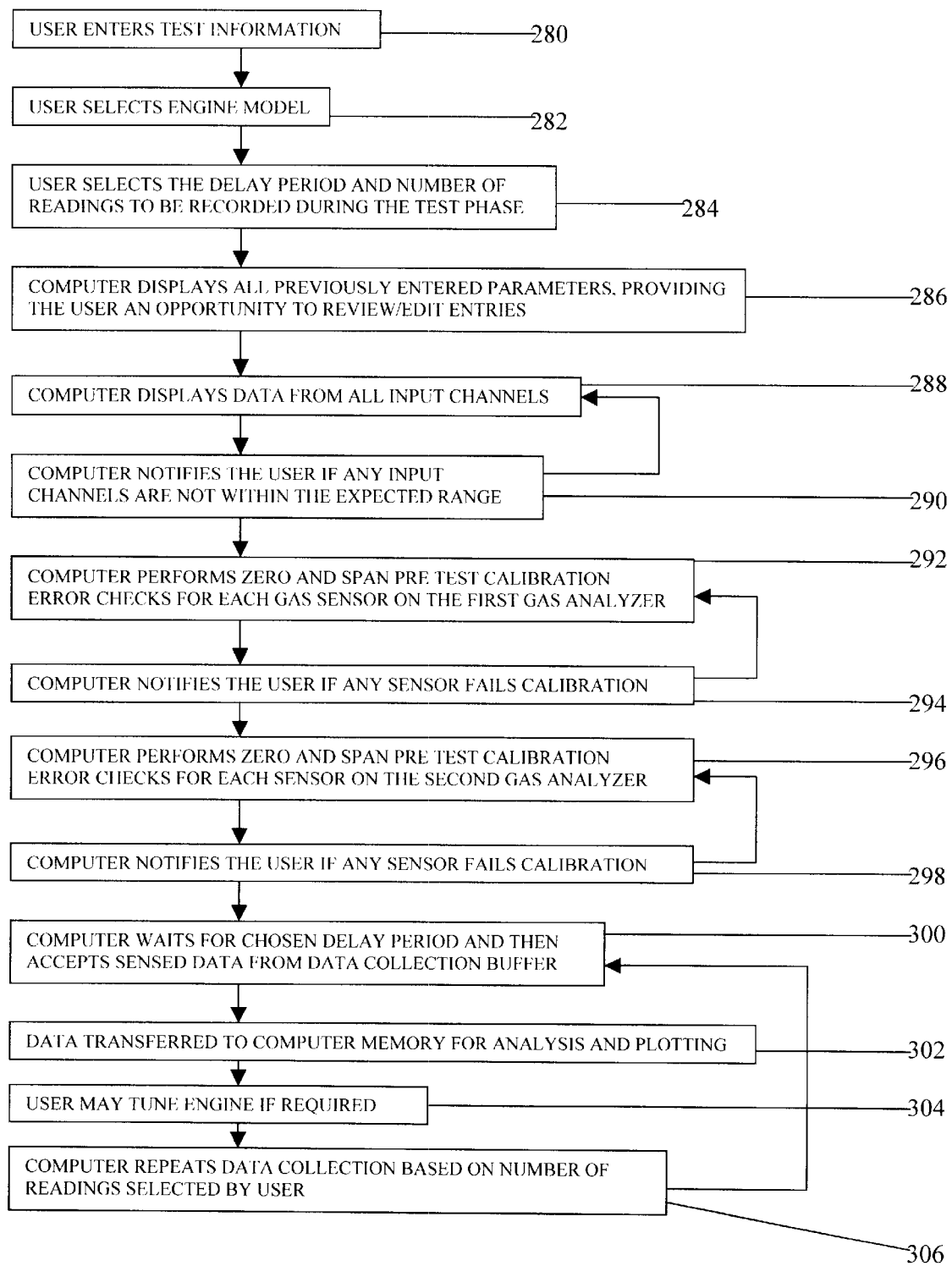
FIG. 12 is a flowchart showing Catalyst Efficiency mode steps of the use of the WinStack™ software, in accordance with a preferred implementation of a method according to the invention.

As shown in FIG. 12, when the user selects the Catalyst Efficiency test mode, WinStack™ prompts the user to enter, into the appropriate fields, the following data: the facility location, the relevant environmental board; the gas analyzer serial number; the facility operator; an identifier for the person performing the emission test; the ambient conditions at the test site; and whether a Source or Compliance test will be performed (280). The ambient conditions are the ambient barometric pressure and ambient temperature, which are measured by any suitable means.

WinStack™ then requires the user to select an engine model to test (282). WinStack™ lists engine models based on the manufacturer, aspiration (natural or turbo-charged) and the combustion (rich bum or lean bum). WinStack™ then permits the user to set the total number of readings to be recorded during a test, and the time interval between each reading (284).

WinStack™ then displays the previously entered data; checks for blank fields or erroneous inputs and notifies the user if there is an error in the input data; and permits the user to adjust or correct any values through the 'Preferences' section of the menu (286). The test data and ambient condition data are saved to the WinStack™ database for later retrieval and report generation. Once the user indicates that the user is satisfied with the entries, WinStack™ goes into the data acquisition mode.

WinStack™ then displays all the data channels coming from the data collection buffer (288). The display is configured so as to make a viewer aware of any unexpected inputs (ie: inputs that are not within the expected channel ranges) (290), so as to permit the user to remedy a faulty sensor, or correct a situation where a sensor has not been installed or connected properly.

When the user is satisfied that all sensors are reading correctly, the user then instructs WinStack™ to commence the pretest calibration error phase. In the Catalyst Efficency test mode. WinStack™ goes through the same pretest calibration error test as it does in the Emission Source/Compliance test mode, except that the calibration error tests are performed on two gas analyzers (292, 294, 296 and 298).

Once the user is satisfied with the pretest calibration error tests, the user instructs WinStack™ to commence testing. WinStack™ waits for the chosen delay period and then accepts measurements from the data collection buffer (300). Winstack™ transfers the sensed data to the computer memory for analysis and plotting (302). WinStack™ calculates and displays, in real time, any difference in the upstream and downstream levels of $NO$, $NO_2$ $CO$ the $CO_2$. WinStack™ compares the upstream temperature to the temperature necessary to stimulate the desired chemical reaction between the catalyst element and the exhaust gas WinStack™ also displays the temperature differential between the upstream and downstream exhaust gas, which is an indicator of the extent to which the desired exothermic reaction is occurring. The user may tune the engine if required (304). WinStack™ repeats the data acquisition and processing steps for the previously entered test duration (306), providing real time feedback for any tuning or adjustments made by the user.

Figure 13:
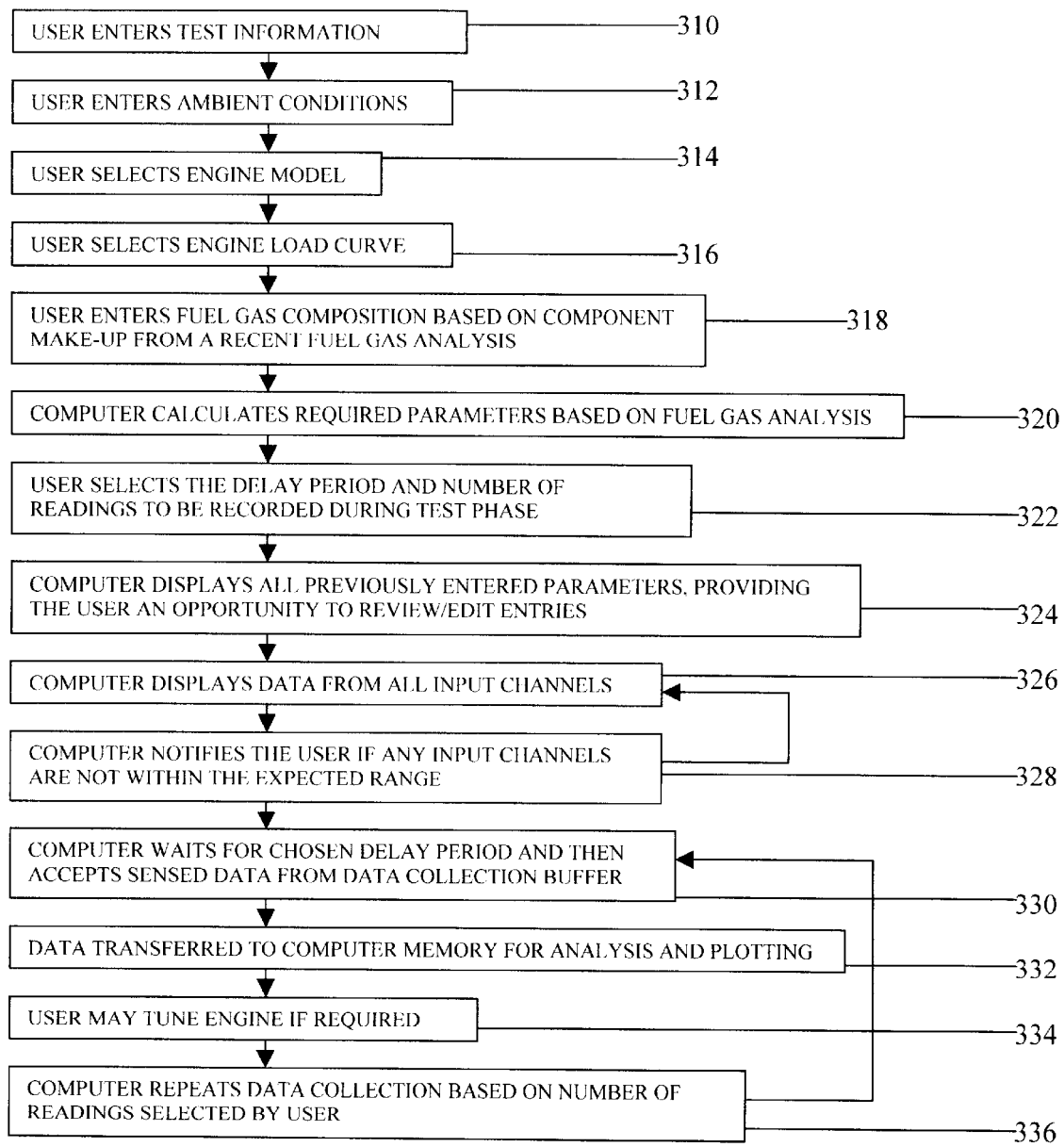
FIG. 13 is a flowchart showing Engine Optimization mode steps of the use of the WinStack™ software, in accordance with a preferred implementation of a method according to the invention.

As shown in FIG. 13, when the user selects the Engine Optimization test mode, WinStack™ prompts the user to enter, into the appropriate fields, the following data: the facility location, the relevant environmental board; the gas analyzer serial number; the facility operator; and an identifier for the person performing the emission test (310). Then the user enters the ambient conditions at the test site (312), being the ambient barometric pressure and ambient temperature, which are measured by any suitable means.

WinStack™ then prompts the user to select an engine model to test (314). WinStack™ lists engine models based on the manufacturer, aspiration (natural or turbo-charged) and the combustion (rich burn or lean burn) WinStack™ will present the user with a set of load curves that pertain to the engine model selected. The user selects the curve that most closely matches current field conditions (316).

To approximate the engine load, WinStack™ correlates the measured intake manifold temperature and pressure with the engine manufacturers load curves (which relate intake manifold pressure and temperature with engine load) and corrects for ambient temperature and barometric pressure (already entered by the user) per the manufacturer's guidelines. Winstack™ uses Newton's Interpolation Method to approximate the engine load at temperature and pressure measurements that do not fall at the discrete points defined by the load curve representations.

In order to approximate the engine brake specific fuel consumption (BSFC), WinStack™ must obtain a corrected fuel flow rate. WinStack™ prompts the user to validate the model of flow meter that will be used to measure the fuel and enter a K-factor based on the most recent calibration of the flow meter [45]. The user then enters a recent fuel gas composition (318). WinStack™ can calculate the gross calorific value and the molecular weight of the fuel based on the fuel gas composition, or have the user directly enter these parameters from a fuel gas composition sheet. WinStack™ then calculates the pseudo critical properties of the fuel gas (320), which are required for the fuel gas compressibility calculation. WinStack™ then permits the user to set the total number of readings to be recorded during a test, and the time interval between each reading (322). WinStack™ then displays the previously entered data (324), and permits the user to adjust or correct any values through the 'Preferences' section of the menu. Once the user indicates that the user is satisfied with the entries, all data calculated and recorded during this step is saved to the WinStack™ database for later retrieval and report generation; and WinStack™ goes into the data acquisition mode.

WinStack™ then displays all the data channels coming from the data collection buffer (326). The display Is configured so as to make a viewer aware of any unexpected inputs (ie: inputs that are not within the expected channel ranges) (328), so as to permit the user to remedy a faulty sensor, or correct a situation where a sensor has not been installed or connected properly.

WinStack™ then prompts the user to select either line or bar graph format for real-time graphical display purposes. When the user instructs WinStack™ to start the test, WinStack™ waits for the chosen delay period and then accepts raw data from the data collection buffer at the time interval previously stipulated by the user (330). WinStack™ transfers the data to the computer memory for analysis and plotting (332). WinStack™ calculates an approximated brake specific fuel consumption (BSFC) from the approximated engine load determined from the intake manifold pressure and temperature measurements; the corrected fuel gas flow; and the gross calorific value of the fuel. WinStack™ displays the real-time BSFC, corrected fuel flow measurement, and approximated engine load, on individualized windows-style tab pages. The user may make adjustments to the engine (334) and view the effects in real-time. WinStack™ repeats the data collection based on the number of readings selected by the user (336). Once the test is complete, all the raw data is saved to the database to allow report generation at a later date.

The foregoing is a description of a preferred embodiment of the invention which is given here by way of example. The invention is not to be taken as limited to any of the specific features as described, but comprehends all such variations thereof as come within the scope of the appended claims.

What is claimed is:

1. A method for determining the emission rate of a selected test gas emitted in the exhaust gas of a gas-fueled engine, the method comprising the steps of:
   (A) measuring the relative concentration of a test gas in the exhaust gas;
   (B) measuring each of fuel-gas flowrate, fuel-gas temperature and fuel-gas pressure;
   (C) computing a volumetric flowrate of the exhaust gas from the fuel-gas flowrate, temperature and pressure measurements; and
   (D) computing a test gas emission rate from the calculated volumetric flowrate of the exhaust gas and measurement of relative concentration of the test gas;
   wherein steps C and D, are performed in real time by a suitably-programmed digital computer.

2. The method of claim 1, further comprising the step of sending the computed test gas emission rate to a display device.

3. The method of claim 1, wherein the steps of the method are repeated at a selected time interval a selected number of times so as to calculate a series of test gas emission test data.

4. The method of claim 3, further comprising the step of sending the measurements to a computer-readable database for subsequent preparation of a formal emission report.

5. The method of claim 1, further comprising the steps of:
   (A) obtaining from a computer-readable database:
      (i) a measurement of the ambient pressure;
      (ii) an instantaneous compressibility factor for the fuel gas;
      (iii) a gross calorific value for the fuel gas; and
      (iv) a dry fuel F factor for the fuel gas; and
   (B) measuring the relative concentration of $O_2$ in the exhaust gas;
   wherein, the step of computing a volumetric flowrate of the exhaust gas from the fuel-gas flowrate, temperature and pressure measurements, includes using the measurements of ambient pressure; instantaneous compressibility factor for the fuel gas; gross calorific value for the fuel gas; dry fuel F factor for the fuel gas; and relative concentration of $O_2$ in the exhaust gas, to calculate the volumetric flowrate of the exhaust gas.

6. The method of claim 1, further comprising the step of obtaining a fuel-gas flowrate measurement conversion factor; and wherein the step of computing a volumetric flowrate of the exhaust gas from the fuel-gas flowrate, temperature and pressure measurements, includes using the fuel-gas flowrate measurement conversion factor to calculate the volumetric flowrate of the exhaust gas.

7. The method of claim 1 for use with an engine having an intake manifold, the method further comprising the steps of:
   (A) measuring in real time each of intake manifold temperature and intake manifold pressure;
   (B) determining the engine load from the measurements of intake manifold temperature and intake manifold pressure, and an engine load curve; and
   (C) calculating in real time an emission rate per engine load using the computed test gas emission rate and the engine load.

8. The method of claim 7, further comprising the steps of:
   (A) obtaining engine data from a computer-readable database; and
   (B) selecting an appropriate engine load curve from a plurality of engine load curves based on the engine data.

9. A method for determining the emission rate of a selected test gas emitted in the exhaust gas of a gas-fueled engine, the method comprising the steps of:
   (A) obtaining:
      (i) a measurement of the ambient pressure;
      (ii) an instantaneous compressibility factor for the fuel gas;
      (iii) a gross calorific value for the fuel gas; and
      (iv) a dry fuel F factor for the fuel gas;
   (B) receiving real-time measurements of the:
      (i) relative concentration of the test gas in the exhaust gas;
      (ii) relative concentration of $O_2$ in the exhaust gas;
      (iii) flow rate of the fuel gas;
      (iv) temperature of the fuel gas; and
      (v) pressure of the fuel gas;
   (C) calculating in real time a dry volumetric flow rate of the fuel gas from the flow rate of the fuel gas, the fuel-gas temperature, the fuel-gas pressure, the ambient pressure and the instantaneous compressibility factor of the fuel gas;
   (D) calculating in real time the volumetric flow rate of the exhaust gas from the dry volumetric flow rate of the fuel gas, the dry fuel F factor, the gross calorific value of the fuel gas and the relative concentration of $O_2$ in the exhaust gas;
   (E) calculating in real time the emission rate of the test gas from the relative concentration of the test gas in the exhaust gas and the volumetric flow rate of the exhaust gas; and
   (F) sending, in realtime, the calculated emission rate of the test gas to a display device;
   wherein the steps are performed by a suitably-programmed digital computer.

10. The method of claim 9, wherein the computer obtains the measurement of ambient pressure; instantaneous compressibility factor for the fuel gas; gross calorific value for the fuel gas; and dry fuel F factor for the fuel gas, from a computer-readable database.

11. The method of claim 10, wherein the computer receives the measurements of relative concentration of the test gas in the exhaust gas; relative concentration of $O_2$ in the exhaust gas; flowrate of the fuel gas; temperature of the fuel gas; and pressure of the fuel gas, from a data collection buffer that collects the relative concentrations of the test gas and $O_2$ from a gas analyzer; collects the flow rate of the fuel gas from a fuel gas flowmeter; collects the fuel gas temperature from a temperature sensor located proximate to the fuel gas flowmeter; collects the fuel gas pressure from a pressure sensor located proximate to the fuel gas flowmeter; formats this collected data into a form suitable for the computer; and sends this formatted data to the computer.

12. A method for determining the emission rate of a selected test gas emitted in the exhaust gas of a gas-fueled engine having an intake manifold, the method comprising the steps of:

(A) measuring the relative concentration of the test gas in the exhaust gas;

(B) measuring each of fuel-gas flowrate, fuel-gas temperature and fuel-gas pressure;

(C) measuring each of intake manifold temperature and intake manifold pressure;

(D) calculating a volumetric flowrate of the exhaust gas using the measurements of the fuel-gas flowrate, temperature and pressure;

(E) calculating a test gas emission rate using the calculated volumetric flowrate of the exhaust gas and the measurement of the relative concentration of the test gas;

(F) determining engine load from a load curve using the intake manifold temperature and intake manifold pressure measurements; and (G) calculating an emission rate per engine load using the calculated emission rate of the test gas and the engine load;

wherein steps D, E, F and G, are performed in real time by a suitably-programmed digital computer.

13. The method of claim 12, further comprising the steps of:

(A) obtaining engine data from a computer-readable database; and (B) selecting an appropriate engine load curve from a plurality of engine load curves based on the engine data.

14. A method for determining the emission rate of a selected test gas emitted in the exhaust gas of a gas-fueled engine having an intake manifold, the method comprising the steps of:

(A) obtaining:
  (i) a measurement of the ambient pressure;
  (ii) instantaneous compressibility factor for the fuel gas;
  (iii) gross calorific value for the fuel gas; and
  (iv) dry fuel F factor for the fuel gas;

(B) receiving a real-time measurement of:
  (i) relative concentration of the test gas in the exhaust gas;
  (ii) relative concentration of $O_2$ in the exhaust gas;
  (iii) flow rate of the fuel gas;
  (iv) temperature of the fuel gas;
  (v) pressure of the fuel gas;
  (vi) intake manifold temperature; and
  (vii) intake manifold pressure;

(C) calculating in real time a dry volumetric flow rate of the fuel gas from the flow rate of the fuel gas, the fuel-gas temperature, the fuel-gas pressure, the ambient pressure and the instantaneous compressibility factor of the fuel gas;

(D) calculating in real time the volumetric flow rate of the exhaust gas from the dry volumetric flow rate of the fuel gas, the dry fuel F factor, the gross calorific value of the fuel gas and the relative concentration of $O_2$ in the exhaust gas;

(E) calculating in real time the emission rate of the test gas from the relative concentration of the test gas in the exhaust gas and the volumetric flow rate of the exhaust gas; and (F) determining in real time engine load from a load curve using the intake manifold temperature and intake manifold pressure measurements;

(G) calculating in real time emission rate per engine load from the calculated emission rate and engine load;

wherein the steps are performed by a suitably-programmed digital computer.

15. An engine emission analyzer for use in determining the emission rate of a selected test gas emitted in the exhaust gas of a gas-fueled engine having an intake manifold, the engine emission analyzer comprising:

(A) a data collection buffer configured to connect to, and receive data from: a gas analyzer for sensing the relative concentration of the specified test gas and $O_2$; an intake manifold temperature sensor; an intake manifold pressure sensor; a fuel gas flowmeter; a fuel gas pressure sensor; and a fuel gas temperature sensor;

(B) a computer-readable database configured for storing data used in performing the engine emission analysis, including: specifications of an engine being tested; a maximum emission limit for each test gas (pollutant) specified in a relevant permit; testing parameters; and various calculation factors;

(C) a display device;

(D) a programmed computer connected to the data collection buffer, computer-readable database and display device;

wherein, when installed and in use, the data collection buffer digitizes the data it receives from the intake manifold temperature sensor, intake manifold pressure sensor, fuel gas flowmeter; fuel gas pressure sensor; and fuel gas temperature sensor; organizes this data and the data received from the gas analyzer into batches that can be recognized by the programmed computer and sends the batches to the programmed computer; and wherein the programmed computer receives the batches of data from the data collection buffer; obtains data from the database as required, performs the engine emission analysis calculations to produce emission rates of the test gases or gas, and sends the calculated emission rates and to the display device.

16. The engine emission analyzer of claim 15, wherein the data collection buffer is configured to connect to, and receive data from, a second gas analyzer, such that the engine emission analyzer may be used to test the effectiveness of in-line catalyst elements (catalytic converters) for treating exhaust, by analyzing the exhaust gas from upstream and downstream of an in-line catalyst element.

17. The engine emission analyzer of claim 16, wherein the data collection buffer is configured to connect to, and receive data from, two exhaust temperature sensors, such that the engine emission analyzer may be used to determine the temperature differential between upstream and downstream of an in-line catalyst element.

18. A real-time method for determining the emission rate of a selected test gas emitted in the exhaust gas of a gas-fueled engine, from real-time data respectively representing fuel-gas flowrate, fuel-gas temperature and fuel-gas pressure and relative concentration of the test gas in the exhaust gas; the method comprising the real-time steps of:

(A) calculating the volumetric flowrate of the exhaust gas using the data representing the fuel-gas flowrate, temperature and pressure;

(B) calculating the emission rate of the test gas using data representing the calculated volumetric flowrate of the exhaust gas and data representing the relative concentration of the test gas in the exhaust gas; and (C) providing as an output test gas emission rate data representing the emission rate of the test gas.

19. The method of claim 18, performed by a suitably-programmed digital computer.

20. The method of claim 19, wherein the output test gas emission rate data are in a form suitable for recording or for conversion to a selected recording.

21. The method of claim 19, wherein the output test gas emission rate data are in a form suitable for driving a selected monitor display.

22. The method of claim 19, additionally comprising saving and storing the output test data.

23. A method as defined in claim 22, additionally comprising repeating steps (A), (B) and (C) at selected intervals for a selected number of repetitions, so as to generate as a stored output data representing a series of test results.

24. A real-time method for determining the emission rate of a selected test gas emitted in the exhaust gas of a gas-fueled engine, from (i) stored data respectively representing the ambient pressure, an instantaneous compressibility factor for the fuel gas, a gross calorific value for the fuel gas, and a dry fuel F factor for the fuel gas; and (ii) real-time data respectively representing fuel-gas flowrate, fuel-gas temperature, fuel-gas pressure, relative concentration of the test gas in the exhaust gas, and relative concentration of oxygen in the exhaust gas;

the method comprising the real-time steps of:

(A) calculating the volumetric flowrate of the exhaust gas from the data representing the ambient pressure, instantaneous compressibility factor for the fuel gas, gross calorific value for the fuel gas, dry fuel F factor for the fuel gas, relative concentration of oxygen in the exhaust gas, and the fuel-gas flowrate, temperature and pressure;

(B) calculating the emission rate of the test gas from data representing the calculated volumetric flowrate of the exhaust gas and data representing the relative concentration of the test gas in the exhaust gas; and (C) providing as an output test gas emission rate data representing the emission rate of the test gas.

25. The method of claim 24, performed by a suitably-programmed digital computer.

26. The method of claim 25, wherein the output test gas emission rate data are in a form suitable for recording or for conversion to a selected recording.

27. The method of claim 25, wherein the output test gas emission rate data are in a form suitable for driving a selected monitor display.

28. The method of claim 25, additionally comprising saving and storing the output test data.

29. A method as defined in claim 28, additionally comprising repeating steps (A), (B) and (C) at selected intervals for a selected number of repetitions, so as to generate as a stored output data representing a series of test results.

30. The method of claim 25, for use with an engine having an intake manifold, and wherein data representing intake manifold temperature and intake manifold pressure are available, comprising the additional step prior to step (C) of:

determining engine load and providing data representing engine load from the data representing the intake manifold temperature and intake manifold pressure;

wherein the output test data are correlated with the engine load data.

* * * * *